United States Patent
Webb

(10) Patent No.: US 9,983,869 B2
(45) Date of Patent: May 29, 2018

(54) ADAPTIVE INTERFACE FOR CROSS-PLATFORM COMPONENT GENERATION

(71) Applicant: The MathWorks, Inc., Natick, MA (US)

(72) Inventor: Peter Hartwell Webb, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 194 days.

(21) Appl. No.: 14/448,671

(22) Filed: Jul. 31, 2014

(65) Prior Publication Data

US 2016/0034276 A1 Feb. 4, 2016

(51) Int. Cl.
| | |
|---|---|
| *G06F 9/44* | (2018.01) |
| *G06F 21/62* | (2013.01) |
| *G06F 21/10* | (2013.01) |
| *G06F 9/445* | (2018.01) |
| *G06F 21/12* | (2013.01) |

(52) U.S. Cl.
CPC .............. *G06F 8/76* (2013.01); *G06F 8/60* (2013.01); *G06F 21/105* (2013.01); *G06F 21/125* (2013.01); *G06F 21/6281* (2013.01)

(58) Field of Classification Search
CPC ...... G06F 8/76; G06F 11/3612; G06F 21/105; G06F 21/125
USPC .......................................................... 726/2
See application file for complete search history.

(56) References Cited

U.S. PATENT DOCUMENTS

| | | | |
|---|---|---|---|
| 4,989,141 | A | 1/1991 | Lyons et al. |
| 5,381,555 | A | 1/1995 | Brauns et al. |
| 5,572,652 | A | 11/1996 | Robusto et al. |
| 5,579,520 | A | 11/1996 | Bennett |
| 5,708,827 | A | 1/1998 | Kaneko et al. |
| 5,721,847 | A | 2/1998 | Johnson |
| 5,883,623 | A | 3/1999 | Cseri |
| 5,893,123 | A | 4/1999 | Tuinenga |
| 6,061,665 | A | 5/2000 | Bahreman |
| 6,405,225 | B1 | 6/2002 | Apfel et al. |
| 6,542,880 | B2 | 4/2003 | Rosenfeld et al. |
| 6,584,836 | B1 | 7/2003 | Shteinhauz et al. |

(Continued)

FOREIGN PATENT DOCUMENTS

WO 00/04707 A1 1/2000

*Primary Examiner* — Hadi S Armouche
*Assistant Examiner* — Angela Holmes
(74) *Attorney, Agent, or Firm* — Nelson Mullins Riley & Scarborough LLP

(57) ABSTRACT

Exemplary embodiments provide adapted components that may be used by a computer program under different execution contexts. The adapted components may include platform independent source code which may be executed regardless of the execution context in which the component is deployed. Adaptation logic may wrap the execution context independent component in a wrapper. The wrapper may perform data marshaling between the execution context independent component and a computer program invoking the execution context independent component, or the host system on which the computer program is deployed. The execution context independent component may be adapted to a new execution context dynamically the first time that the execution context independent component is invoked in the execution context. Thereafter, the execution context independent component may be invoked statically without the need to re-adapt the component.

20 Claims, 17 Drawing Sheets

(56) References Cited

U.S. PATENT DOCUMENTS

| | | | |
|---|---|---|---|
| 6,634,019 B1 | 10/2003 | Rice et al. | |
| 6,654,950 B1 | 11/2003 | Bamishan | |
| 6,718,534 B1 | 4/2004 | Carter et al. | |
| 6,766,350 B1 * | 7/2004 | Moreau | G06F 9/465 |
| | | | 709/200 |
| 6,779,151 B2 | 8/2004 | Cahill et al. | |
| 7,093,240 B1 | 8/2006 | Rodi et al. | |
| 7,353,502 B2 | 4/2008 | Stewart et al. | |
| 7,624,372 B1 | 11/2009 | Stewart | |
| 8,073,934 B1 * | 12/2011 | Zhong | H04L 67/1002 |
| | | | 709/220 |
| 8,225,300 B1 | 7/2012 | Webb et al. | |
| 8,321,847 B1 | 11/2012 | Garvin et al. | |
| 8,806,428 B1 | 8/2014 | Webb et al. | |
| 9,582,288 B1 | 2/2017 | Stewart | |
| 2002/0035581 A1 | 3/2002 | Reynar et al. | |
| 2002/0091871 A1 | 7/2002 | Cahill et al. | |
| 2002/0129342 A1 | 9/2002 | Kil et al. | |
| 2003/0009536 A1 | 1/2003 | Henderson et al. | |
| 2003/0030664 A1 | 2/2003 | Parry | |
| 2003/0056181 A1 | 3/2003 | Marathe | |
| 2003/0106040 A1 | 6/2003 | Rubin et al. | |
| 2003/0126058 A1 | 7/2003 | Hunter | |
| 2003/0226105 A1 | 12/2003 | Waldau | |
| 2004/0006762 A1 | 1/2004 | Stewart et al. | |
| 2004/0015783 A1 | 1/2004 | Lennon et al. | |
| 2004/0025170 A1 | 2/2004 | Cao | |
| 2004/0039727 A1 | 2/2004 | Dessloch et al. | |
| 2004/0103366 A1 | 5/2004 | Peyton-Jones et al. | |
| 2006/0053383 A1 | 3/2006 | Gauthier et al. | |
| 2008/0004737 A1 | 1/2008 | Bennardo | |
| 2008/0256508 A1 | 10/2008 | Jonsson | |

\* cited by examiner

ADAPTIVE INTERFACE FOR CROSS-PLATFORM COMPONENT GENERATION

DETAILED DESCRIPTION

Figure 1:
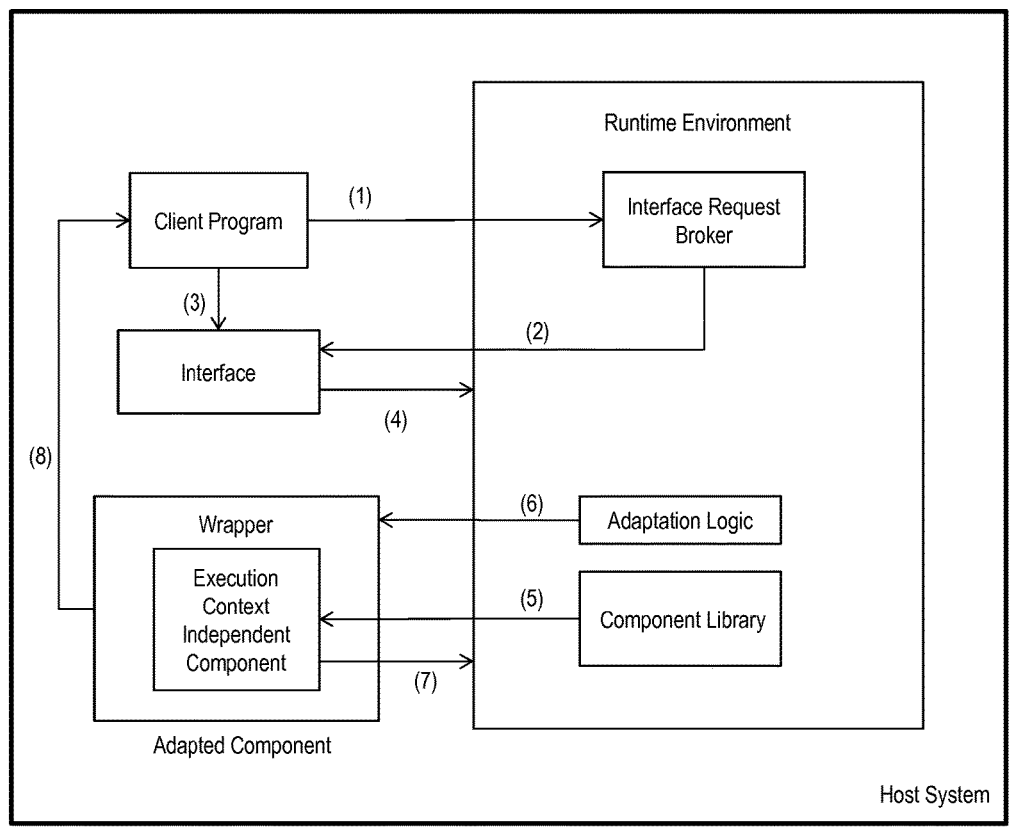
FIG. 1 depicts interactions between an exemplary computer program, runtime environment, and adapted component according to an exemplary embodiment.

A computer program may execute in a particular execution context. The execution context may represent system parameters that have an effect on the way the program executes (e.g., execution using different programming languages, or in different operating systems, etc.). As the computer program executes in the execution context, the computer program may make use of components. A component may represent a unit of functionality (e.g., a piece of executable code) that performs an action on behalf of the host program, such as a method, function, subroutine, etc. In some embodiments, a component may be a unit of functionality that is separate and distinct from the computer program that uses the component. In some embodiments, the component and the computer program may be from different vendors.

A computer program that hosts (e.g., calls or otherwise utilizes) a component may be referred to as a host program. The host program may rely on, or make use of, a client or client program in that supports an execution of the host program. For example, if the host program is a standalone computer program, the host program's proximal client is the local operating system. A component may also make use of a client (in the above examples, the proximal client of the component is the host program). As used herein, the terms client and client program are intended to be synonymous.

One example of a computer program is Microsoft Excel®, of the Microsoft Corporation of Redmond, Wash. Excel® may, for example, host an add-in in the form of a MATLAB® component created by the MATLAB Builder™ EX software of the Mathworks, Inc. of Natick, Mass. In this case, Excel® represents a host program, while the MATLAB® component is a component. The client of Excel® (assuming that Excel® is operating as a local standalone program) is the local operating system.

A developer writing a computer program may wish to support the computer program in different execution contexts. For example, the developer may wish to integrate a component into the same host program on different hardware or operating system platforms. In other examples, the developer may wish to integrate the component into different host programs on the same platform, or deploy the component in different languages.

Conventionally, if a host program makes use of a component, each different execution context could require a unique component specialized to that execution context. Acquiring these specialized components (one for each supported execution context) may entail significant costs in resources and/or inefficiencies (e.g., maintaining large numbers of different components).

Furthermore, vendors may be hesitant to provide components to a licensed user without taking significant (and potentially expensive) precautions to prevent the components from being used in an unlicensed manner. Nonetheless, it may remain difficult to enforce product licenses because the vendor cannot be assured that the components will only be used by the licensed users, or will not be modified for use with unlicensed execution contexts.

In contrast, exemplary embodiments described herein provide an adapted component that may be used by a computer program under different execution contexts. The adapted component may include an execution context independent component that is executable regardless of the execution context in which the execution context independent component is employed. The execution context independent component may be wrapped in logic that is compatible with the execution context of the computer program. The wrapper may allow data to be exchanged between the computer program and the execution context independent component. The logic may be dynamically generated when the computer program first invokes the component, and subsequently stored so that the adapted component can later be executed in a static fashion. Thus, the costs of acquiring and using components for the computer program may be significantly reduced.

Furthermore, the components may enforce licensing terms independently, without interaction from the vendor. For example, the execution context independent components may refuse to adapt themselves to an unlicensed execution context, may refuse to execute under an unlicensed execution context, or may prevent access to unauthorized users.

FIG. 1, provides an overview of an exemplary embodiment. A computer program may execute on a host system. The computer program and host system may, individually or together, define parameters that make up the execution context of the computer program.

An execution context may refer to the circumstances and/or environment under which a computer program (such as a host program) executes, which have the ability to affect the computer program's execution. Examples of the elements making up an execution context may include, but are not limited to, the programming language used, the architecture under which the program executes, and/or the host platform running the computer program. An execution context may have a layered or hierarchical structure, and in some embodiments may include (without limitation): the hardware on which the host program executes; the operating system; the language runtime (e.g., C, C++, Java, Matlab, etc.); the language and external services available within the given runtime; the identity of the host program (e.g., Microsoft Excel); the features and services available within the host program (e.g., the tables and cells of Excel); the settings and the static and dynamic data associated with each layer of the context; the identify of the user accessing the program; the level of permissions and entitlements assigned to the user; the license governing the program or a component of the program; and metadata describing the context, among other possibilities. It is noted that the execution context of a client or client program may differ from the execution context of a host program. Such contexts may overlap completely, some, or not at all.

A computer program, including a host program and/or a client program, may be a set of instructions executable on a computer. For example, a computer program may be an executable file, or may be a code module or snippet, or some other unit of logic which may be smaller than what may traditionally be considered a complete program.

During execution, a client program may be supported by a runtime environment. A runtime environment may provide basic functionality for the computer program, such as allocating memory space for local variables, managing the processor stack, providing basic mathematical capabilities, supporting function overloading, etc. Examples of runtime environments include, but are not limited to, the Java® Runtime Environment and the MATLAB® technical computing environment.

The runtime environment may provide access to components for the client program. A component may refer to a unit of functionality that may be accessed by a host program in order to perform an action on behalf of the host program. For example, a component may be a function, an interface to a library or a shared file, external computer code, a subroutine, etc. The runtime environment may provide access to the components directly (e.g., via built-in tools, services, or functionality, such as Java's AWT toolkit or MATLAB's cell arrays) or indirectly (e.g., via a component library).

At some point, a client of a host program may need to access the host program, for example to start execution of a standalone program or call a function of a component. Accordingly, the client may, at step (1), send a request for the component to an interface request broker. The request may identify the requested component (e.g., by specifying the name of the component and the kind of inputs that will be provided to the desired component).

At step (2), the interface request broker may generate an interface (similar to an Application Programming Interface, or "API") to the requested component. In some embodiments, the interface may function as a proxy for the requested component. The interface may provide information from the client program to the runtime environment. The information, may allow the runtime environment to retrieve a component corresponding to the requested component and to adapt the requested component to the appropriate execution context (e.g., by making the requested component suitable for execution on the host system with a specified operating system, etc.).

During execution, the client program may invoke the component using the interface. For example, at step (3) the interface may receive an invocation according to a format compatible with the execution context. At step (4), the interface may forward the invocation to the runtime environment, which may be responsible for generating an adapted component.

It is understood that the component may be adapted at several different times during the process, such as at steps (2) and/or (4).

The adapted component may be based on an execution context independent version of the requested component (hereafter, a "execution context independent component"). An execution context independent component may be a version of the component which can be executed regardless of the execution context in which the component is invoked. Execution context independence may be achieved, for example, through the use of a runtime environment that abstracts away the differences between different execution contexts (e.g., using the Java® Virtual Machine, the Matlab® Compiler Runtime, etc.). Alternatively or in addition, execution context independent components may be developed using execution context independent code which either does not make use of specialized capabilities of an execution context, or provides alternative techniques for handling a situation where a specialized capability is called for but is not present. Many Internet-based languages are based on execution context independent code, such as Hypertext Markup Language ("HTML"), eXtensible Markup Language ("XML"), Cascading Style Sheets ("CSS"), JavaScript, etc.

It is noted that the execution context independent component need not be entirely independent of all aspects of the execution context or all execution contexts in which the execution context independent component operates. For example, the execution context independent component may be independent of aspects of the execution context of the client program.

At step (5) the runtime environment may retrieve the execution context independent component corresponding to the requested component from a component library. For example, the runtime environment may search the component library for a version of the execution context independent component that matches the name and type/number of inputs of the interface.

At step (6), adaptation logic in the runtime environment may generate a wrapper for the execution context independent component. The wrapper may translate any input to the execution context independent component (e.g., input provided by the client program) into a format understandable by the execution context independent component.

The execution context independent component may be executed using the input. It is noted that, in order for the execution context independent component to be executed, it may need to draw upon resources of the runtime environment. Thus, the execution context independent component may invoke the services of the runtime environment in step (7).

If the execution context independent component generates output, the wrapper may translate the output into a format understandable by the client program. The translated output may be provided to the client program at step (8).

Figure 2A:
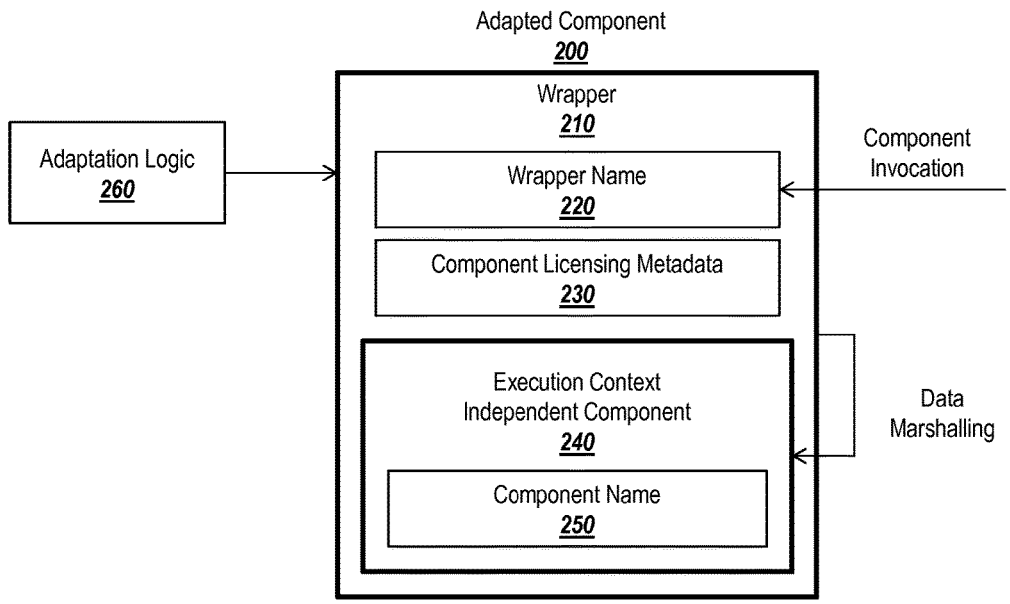
FIG. 2A depicts an exemplary adapted component forming a wrapper around an execution context independent component according to an exemplary embodiment.

The combination of the wrapper and the execution context independent component may be referred to as an adapted component (although it is to be understood that the functionality of the wrapper and the execution context independent component may also be provided separately from each other). FIG. 2A provides a first example of an adapted component 200.

The adapted component 200 may include a wrapper 210 having a wrapper name 220 and (optionally) component licensing metadata 230. The wrapper name 220 may correspond to the name of the component invoked by the client program. The wrapper name 220 and/or the name of the component may be any type of identifier that can be used to reference the components. The component licensing metadata 230 may include licensing information pertaining to users that are authorized to use the adapted component 200. The licensing information may also indicate under what execution contexts the adapted component 200 may be used.

The adapted component 200 may further include an execution context independent component 240, as noted above. The wrapper 210 of adapted component 200 need not physically contain the execution context independent component 240 (e.g., the code for the execution context independent component 240 does not need to be present within the source code for the adapted component 200). Rather, the wrapper 210 may include a reference to the execution context independent component 240, such as a pointer to a memory location, network location, etc. where the execution context independent component 240 is stored.

The execution context independent component 240 may be identified by a component name 250. The component name 250 may include an identifier for identifying the execution context independent component 240. In some instances, the execution context independent component 240 may be the same as the wrapper name 220. Invoking execution context independent component 240 using the same name as the wrapper 210, may simplify the process of identifying, generating, and using the adapted component 200.

A client program may invoke the adapted component 200 by passing the wrapper name 220, along with information relating to any input(s) (if present), to an interface. The interface may invoke the component by calling the adapted component 200 according to the wrapper name 220 (see the arrow labeled "component invocation" in FIG. 2A). Upon invocation (or prior to invocation), adaptation logic 260 may locate an execution context independent component 240 having a component name 250 that matches the wrapper name 220. The adaptation logic 260 may wrap the execution context independent component 240 in the wrapper 210, and may provide the wrapper 210 with instructions for performing data marshalling between the client program/operating system and the execution context-independent component (see the arrow labeled "data marshalling" in FIG. 2A).

Data marshalling may refer to the movement of data across logical or physical boundaries. For example, it may not be possible to move data directly between the client program and the execution context independent component 240. This may be due to the fact that the client program formats data according to the execution context in which the client program operates, while the execution context independent component 240 formats data in an execution context independent manner that may be different from the data formatting of the client program. Thus, the execution context independent component 240 may be unable to interpret data from the client program, and vice-versa. The wrapper 210 may perform data marshalling by translating input(s) provided by the client program into a format understandable by the execution context independent component 240. The wrapper 210 may further translate output(s) provided by the execution context independent component 240 into a format understandable by the client program.

The execution context independent component 240 may execute and may return one or more output values to the wrapper 210. The wrapper 210 may perform data marshalling on the output values to transform the output values into a format understandable by the client program. The wrapper 210 may then return the transformed output values to the client program.

Once generated, the adapted component 200 may represent an execution-context-specific component that is adapted to the client program/operating system. The adapted component 200 may be directly called by the client program. In other words, the process of turning the execution context independent component 240 into an adapted component 200 may initially be performed dynamically when the adapted component 200 is first requested. However, for subsequent invocations, the adapted component 200 may be called directly in a static manner using the wrapper name 220. This allows for a relatively high performance for subsequent calls to the adapted component 200 as compared to the situation where the adapted component is always generated dynamically.

The example depicted in FIG. 2A wraps the execution context independent component 240 in a wrapper 210 to from the adapted component 200. However, as an alternative or in addition to this embodiment, an adapted component 200 may also be based on a component that is specific to a particular execution context (rather than being execution context independent). Such an embodiment is depicted in FIG. 2B.

Figure 2B:
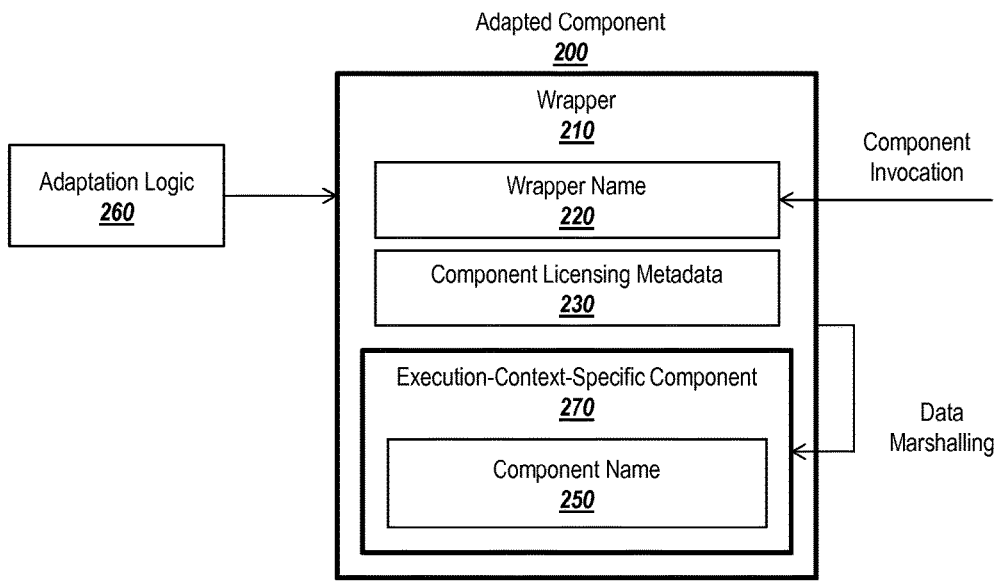
FIG. 2B depicts an exemplary adapted component forming a wrapper around an execution-context-specific component according to an exemplary embodiment.

In embodiment of FIG. 2B, the adapted component 200 may be invoked by calling the wrapper name 220. The adapted component 200 may then call an execution-context-specific component 270 according to its component name 250, which may be the same as the wrapper name 220. The execution-context-specific component 270 may be a component that is compatible with an execution context that differs from the execution context of the client program/operating system. Alternatively or in addition, the execution-context-specific component 270 may be compatible with the execution context of the client program/operating system. This may be the case even though the client program does not know or acknowledge that the execution context specific component 270 is compatible with the execution context.

In the embodiment of FIG. 2B, the adaptation logic 260 may include logic for translating the execution-context-specific component 270 into a version that is executable in the execution context of the client program/operating system. For example, if the execution-context-specific component represents a component for a 32-bit operating system but the host system uses a 64-bit operating system, the adaptation logic 260 may transform the execution-context-specific component 270 into a 64-bit version. This may be accomplished, for example, by providing a mapping between the RAM addressing scheme of the execution-context-specific component 270 and the RAM addressing scheme of the client program/operating system's execution context).

The embodiments of FIGS. 2A and 2B may be employed separately or together. For example, the library depicted in FIG. 1 may include execution context independent components 240 which are adapted according to the example shown in FIG. 2A. Alternatively, the library may include execution-context-specific components 270 which are adapted according to the example shown in FIG. 2B. In still another embodiment, library may include both execution context independent components 240 and execution-context-specific components 270. If the library includes a mix of different types of components, the adaptation logic 260 may be programmed to identify which type of component is present in the library, and may adapt the component accordingly.

Figure 3:
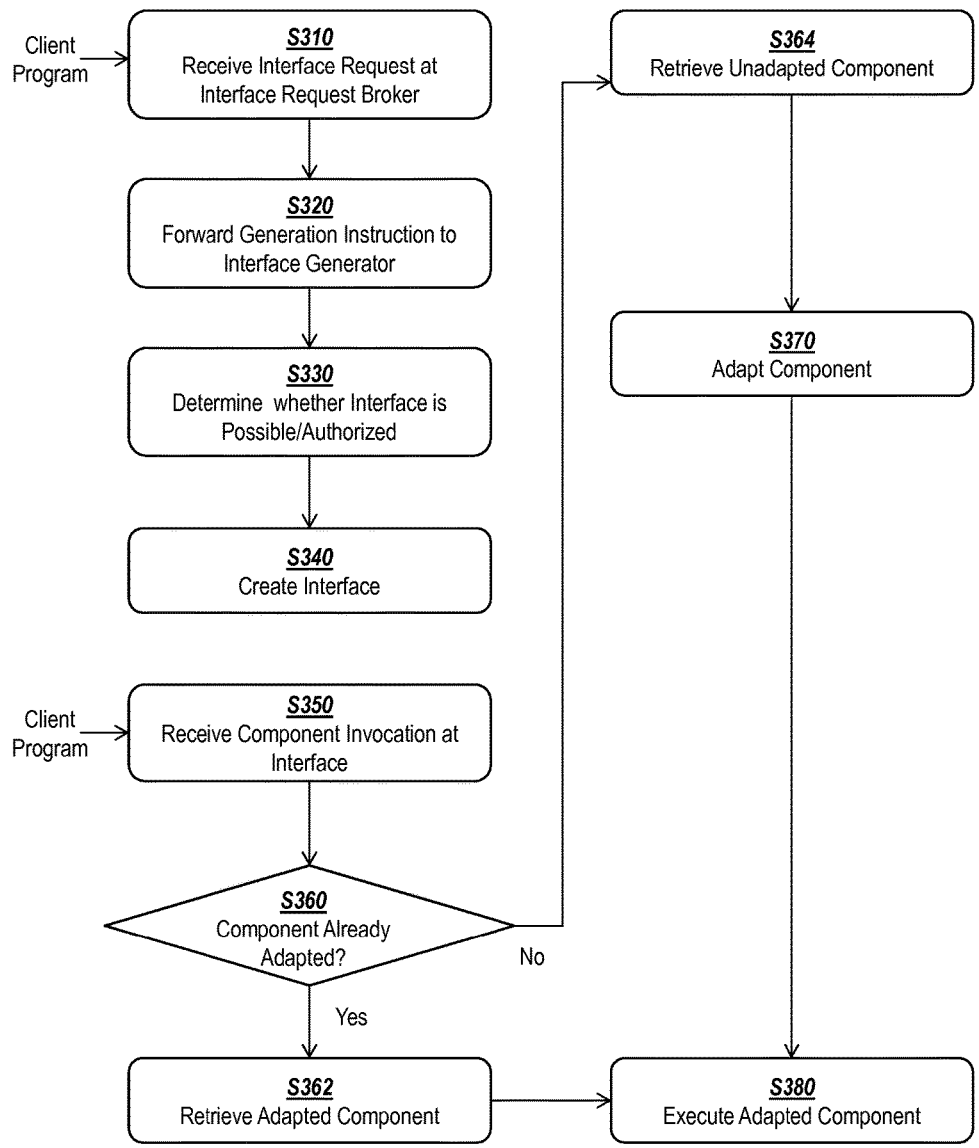
FIG. 3 is a flowchart describing an overview of an exemplary adaptation process.

Adaption processes may be used to generate adapted component 200. FIG. 3 is a flowchart describing an overview of an exemplary adaptation process.

At step S310, the client program may provide an interface request to the interface request broker. The interface request may specify a name of a requested component, details of the execution context in which the requested component is to be used, and the type and/or order of any inputs to the requested component. The interface request may further specify a user or device that is requesting the interface, in order to determine whether the user or device is authorized to use the requested component in the requested execution context.

At step S320, the interface request broker may parse the interface request and create an interface generation instruction. The interface generation instruction may instruct an interface generator to verify that the requested component is available and authorized in the requested execution context, and to generate the requested interface. If the component is not available, the interface generator may fetch the component from a remote repository, if such an action is authorized/supported. (See FIG. 5).

At step S330, the interface generator may determine whether the interface is possible and/or authorized. For example, the interface generator may first check to see whether the requested component has already been adapted for the requested execution context. If so, then the interface is possible. If the requested component has not yet been adapted, then the interface generator may check to determine whether an execution context independent component 240 corresponding to the requested component (and any supporting components needed by the execution context independent component 240) is available in a local library. If the components are not available locally, then the interface generator may check external libraries (e.g., libraries available through the vendor of the component's runtime environment) to see if the components can be acquired remotely. If the components are available locally or can be acquired through external libraries, then the interface is possible. Otherwise, the interface generator may report back to the interface request broker that the interface is not possible, and the interface request broker may report a failure to the client program.

It is noted that unavailability of the component may not be the only reason for reporting failure. For example, the named component may be unable to support the requested interface. This may be determined by comparing the interface request provided in S310 to the interfaces supported by the component. This process may be performed by an interface broker, guided by component metadata.

In order to determine if the interface is authorized, the interface generator may compare the requested execution context as specified in the interface request and/or the identified user (if specified in the interface request) to licensing metadata stored with the runtime environment. The component may also contain licensing metadata 230. Each component may be individually licensed with respect to user, execution context, number of concurrent users, and other parameters of the execution context and interface request.

When a user licenses new components or execution contexts, the licensing metadata of the runtime environment may be updated accordingly. If the interface generator determines that the requested execution context and/or user is authorized to use the requested component, then the interface generator may determine that the interface is authorized. Otherwise, the interface generator may report back to the interface request broker that the interface is not authorized, and the interface request broker may either report a failure to the client program, or may present the client program with options for acquiring authorization (e.g., an option to purchase a license for the requested component).

At step S340, the interface generator may create an interface to the requested component. The interface may represent a proxy for the requested component, which the client program may call according to the execution context of the client program/operating system. In some embodiments, the requested component may be fully adapted to the execution context represented by the interface once the interface is invoked at step S350.

After the interface is invoked by the client program, a request to execute the component corresponding to the interface may be forwarded to the runtime environment. At step S360, the runtime environment may determine whether the component corresponding to the interface has been previously adapted. For example, the runtime environment may consult an adapted component library in which adapted components are stored after they are adapted. If the adapted component corresponding to the requested component is present in the existent adapted component library, then the runtime environment may determine that the component has already been adapted, and processing may proceed to step S362.

At step S362, the previously-adapted component may be retrieved (e.g., from the adapted component library), and the adapted component may be executed by the runtime environment at step S380.

If it is determined at step S360 that the component has not already been adapted, then processing may proceed to step S364 and an unadapted version of the requested component may be retrieved (e.g., from an unadapted component library). The unadapted version of the component may be, for example, a execution context independent version of the component, or an execution-context-specific version of the component. The unadapted version of the component may be incompatible with the execution context of the client program/operating system prior to adaptation.

At step S370, the unadapted version of the component may be adapted using adaptation logic. The adaptation logic may wrap the unadapted version of the component in a wrapper and provide the wrapper with logic allowing the wrapper to perform data marshaling for the unadapted component. The adaptation logic may assign the wrapper a name corresponding to the requested component (and the unadapted version of the component). When the wrapper is generated and wrapped around the unadapted version of the component to form an adapted component, the adapted component may be stored in the adapted component library for future execution. Processing may then proceed to step S380, and the adapted component may be executed.

FIG. 3 describes an exemplary process whereby an interface is created (S340), but the requested component is not adapted until the interface is invoked (S350). Optionally, processing may proceed immediately from step S340 to step S360 to generate the adapted component without waiting for the interface to be invoked at step S350. The adapted component may then be statically executed at the time the interface is invoked (S350), rather than waiting to dynamically generate the adapted component at the time of interface invocation. Dynamically generating the adapted component has the advantage that resources may be conserved until they are needed so that, (for example) if the interface is never used, the requested component never needs to be adapted. On the other hand, statically executing a previously-adapted component may save computing resources at a compile time or a run time of the client program.

Figure 4:
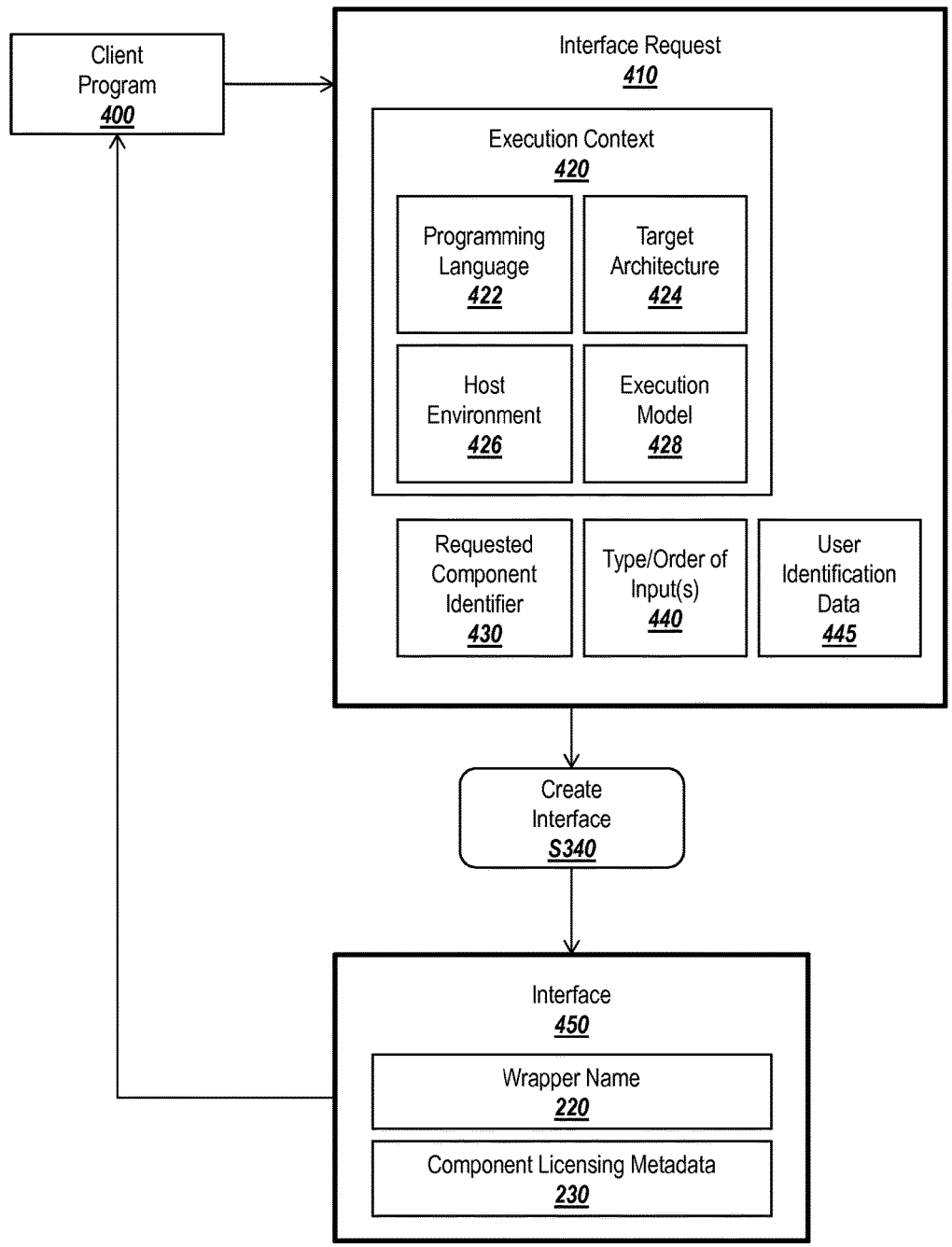
FIG. 4 depicts the generation of an interface to an adapted component suitable for use with exemplary embodiments.

An example of the interface generated at steps S310-S340 is depicted in FIG. 4. A client program 400 may generate the interface request 410 to request an interface for a requested component, although the interface request 410 need not necessarily originate with the client program 400 that will eventually use the requested component. It is noted that FIG. 4 is intended to be exemplary, and that other embodiments may provide more or fewer properties than depicted in FIG. 4.

The interface request may include identifiers relating to the execution context 420 in which the requested component is to operate. For example, the execution context 420 may include an identifier for a programming language 422, an identifier for a target architecture 424, an identifier for a host environment 426, and/or an identifier for an execution model 428.

The programming language 422 may be a language in which the client program 400 is written or is compatible with, or a language in which the requested component should be provided. Examples of programming languages include (but are not limited to) Java, C++, C, .NET, MATLAB, etc.

The target architecture 424 may represent details relating to, for example, the operating system under which the requested component is to operate. The target architecture 424 may specify a make and model of an operating system (e.g., Windows 8 or Red Hat Linux) and/or version details for the operating system (e.g., specifying a 32-bit or a 64-bit memory addressing scheme).

The host environment 426 may specify details relating to the software and/or hardware environment in which the client program 400 runs. For example, if the requested component is to run as a web service, the host environment may be the Apache web service host, Tomcat.

The execution model 428 may represent details relating to how the client program 400 uses processing resources in the host environment 426 (e.g., relating to how processors, cores, and execution threads are used during program execution). Using the above example of a web service, the web service may operate in a "single user, single thread" model. Other examples of execution models include distributed, parallel, interactive, and standalone execution models.

In addition to the execution context 420, the interface request 410 may identify the requested component by providing one or more requested component identifiers 430, such as a name of the requested component(s). Particularly in a case where the requested component is a function capable of being overloaded, the interface request 410 may provide details relating to the type and/or order of inputs 440 to be provided to the requested component. This may allow the runtime environment to distinguish between different (overloaded) versions of components sharing the same requested component identifier 430. This may also assist the runtime environment in determining if the requested interface is possible, that is, if the adaption process can create a wrapper capable of marshalling data between the types in the request and the types supported by the component.

The interface request 410 may further include user identification data 445. The user identification data 445 may include any information allowing an identity of the person or device requesting the interface to be ascertained. The user identification data 445 may allow the interface request broker to determine whether the request is valid (e.g., whether the user/device is authorized to request the specified component).

The interface request may be processed to create an interface 450. The interface 450 may identify a wrapper name 220, which may identify an adapted component to be called when the interface is invoked. The interface 450 may further include component licensing metadata 230, specifying circumstances under which the interface 450 is permitted to be used. For example, the circumstances may include the authorized execution context 420 and any users authorized to invoke the interface 450).

It is noted that the created interface 450 may (at the discretion of the interface request broker) be "larger" than the interface requested by the client program. The interface request broker may decide to instantiate entry points in the interface at once as a matter of efficiency.

The interface 450 may be provided to the client program 400 as a response to the interface request 410. The client program may then invoke the interface 450 by calling the requested component according to the wrapper name 220. A more detailed overview of generating and invoking the interface 450 is depicted in FIGS. 5A-5D.

Figure 5A:
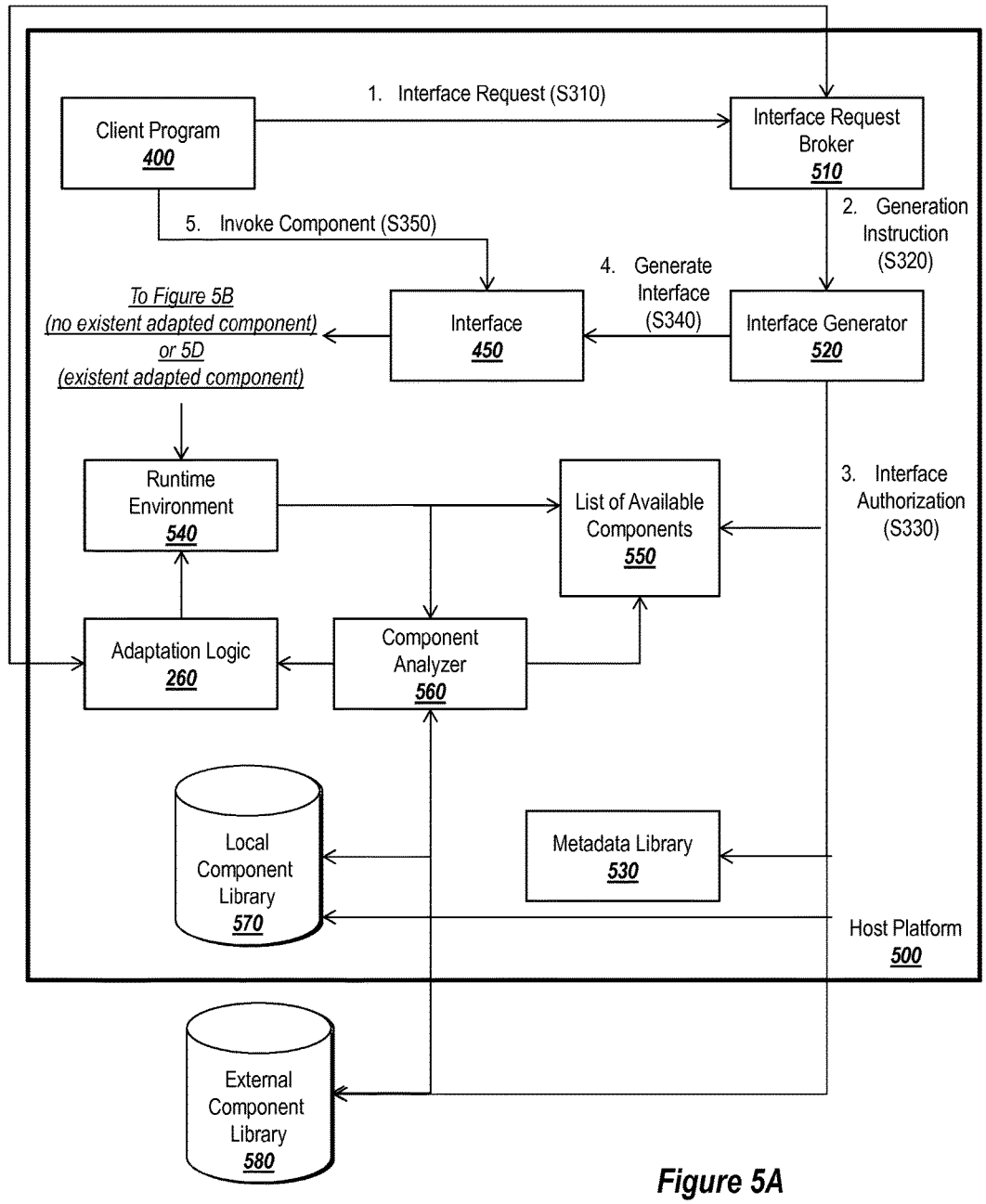
FIGS. 5A-5D are data flow diagrams describing the generation and execution of adapted components according to exemplary embodiments.

Referring now to FIG. 5A, a client program 400 operating on a host platform 500 may submit an interface request (S310) to an interface request broker 510. The interface request broker 510 may represent hardware-based and/or hardware/software-based logic responsible for accepting an interface request, parsing the interface request to ensure that the interface request is in a proper format and includes all required information, and then creating an interface generation instruction that is provided to an interface generator 520.

The interface generator 520 may represent hardware-based and/or hardware/software-based logic responsible for accepting an interface generation instruction, determining if the requested interface is possible and/or authorized, and generating an interface 450. In order to determine if the interface is authorized, the interface generator 520 may consult a metadata library 530, which includes entries corresponding to component licensing metadata. The component licensing metadata may specify, for a given component, information about the component. For example, the information may specify in which execution contexts the component is authorized (e.g., licensed) to be used, and which users are authorized (e.g., licensed) to use the components.

The interface generator 520 may further consult a list of available components 550, local component libraries 570, and/or external component libraries 580 to determine whether any components used by the requested component are available to the host platform 500.

Once the interface generator 520 determines that the interface is possible and/or authorized, the interface generator 520 may generate an interface 450 that may be invoked by the client program 400.

The process of requesting an interface and adapting a component to that interface may be recursive. That is, in the case where the component analyzer 560 requests components from either the local or the external component library, the new components may need to be subject to the same interface generation/component adaption process as the original. For example, the originally requested component (the one that interface 450 needs) may invoke functionality in the newly retrieved component(s). Occasionally, this invocation will request an interface that is not "native" to the retrieved component, but can be generated by the interface request broker. An exemplary recursive procedure is as follows:

1. At step 5, client program 400 may invoke the component via the interface 450.
2. The runtime environment 540 may request the component analyzer 560 to process the component required by interface 450. Part of that request may include one or more interface requests 410, each associated with a call from the component to one or more of the components it depends on. Alternatively, the component analyzer 560 may discover, during the analysis process, that component A invokes component B via interface C. If component B does not yet support interface C, component analyzer 560 may create interface requests 410 corresponding to interface C.
3. Component analyzer 560 may invoke adaption logic 260 with the interface requests 410. Adaption Logic 410 requests that interface broker 510 generate the requested interfaces, and makes them available to runtime environment 540.

Upon invoking a requested component through the interface 450, the interface 450 may forward invocation details to a runtime environment 540 so that the runtime environment 540 may invoke an adapted component corresponding to the requested component.

The runtime environment 540 may include the interface request broker 510, the interface generator 520, the adaptation logic 260, a component analyzer 560, and other entities discussed below, so that these entities are part of the runtime environment 540. Alternatively, these entities may be implemented separately from the runtime environment 540 and may interact with the runtime environment 540, e.g. through proxies, interfaces, function calls, etc.

Depending on whether the requested component corresponding to the invoked interface 450 has already been adapted, the runtime environment 540 may proceed in one of two ways. If no previously-adapted component exists, the runtime environment 540 may dynamically generate an adapted component as described in FIGS. 5B-5C. If an adapted component already exists, the runtime environment may statically invoke the adapted component as described in FIG. 5D.

Figure 5B:
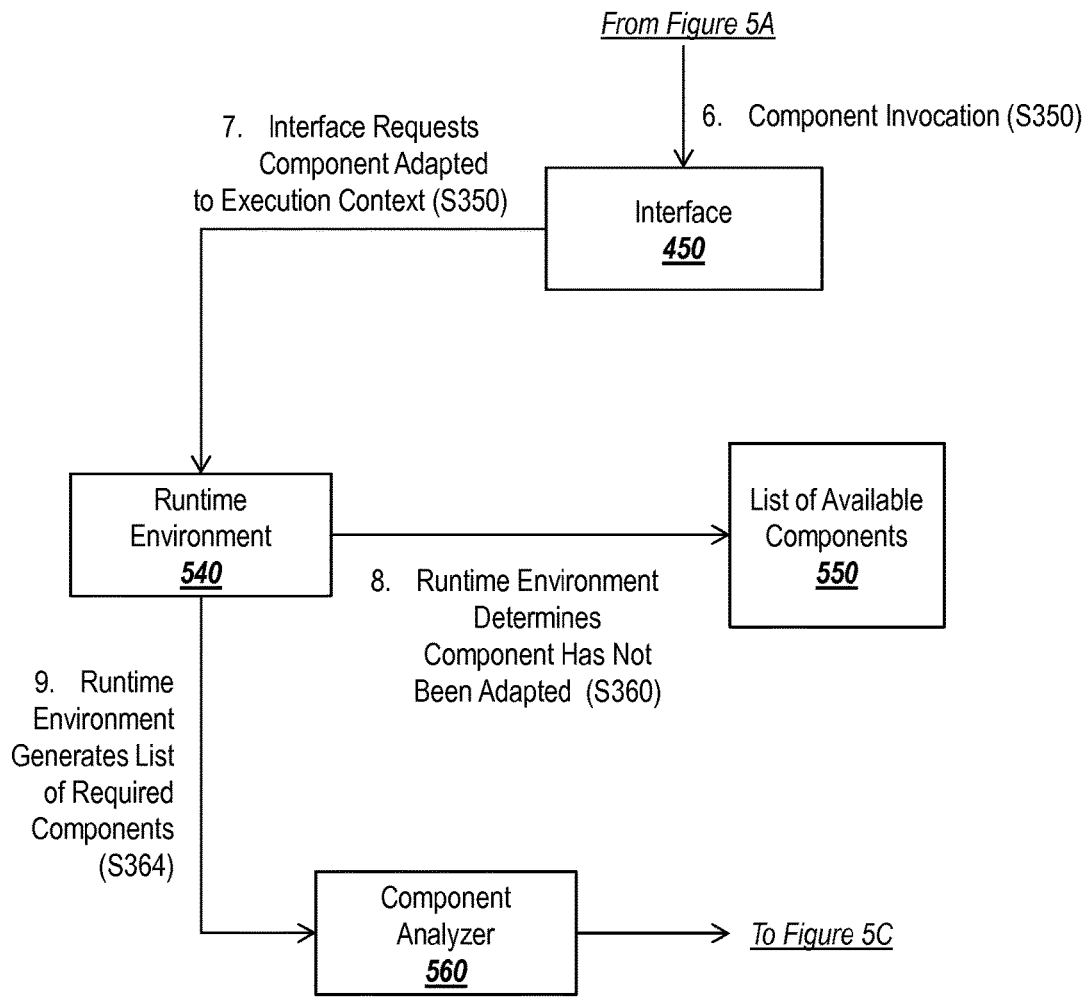

As shown in FIG. 5B, the interface 450 may request a component adapted to the client program 400/host system 500 execution context. The runtime environment 540 may determine that a component corresponding to the interface 450 has not yet been generated, e.g. by consulting a list of available (previously-generated) components 550.

In the case that no previously-adapted component exists, the runtime environment 540 may generate a list of required components (or may defer this analysis to the component analyzer 560). The list of required components may include the component specifically requested by the client program 400 in the interface request 410. At the time the interface 450 is generated, the interface generator 520 may also recursively note any dependencies of the requested component (e.g., functions called by the requested component). This information may be provided to the runtime environment 540, and these dependencies may be included in the list of required components generated by the runtime environment 540.

The list of required components may be forwarded to a component analyzer 560. The component analyzer 560 may represent hardware and/or software logic responsible for evaluating the components in the list of required components and acquiring the components in the list.

Additionally, the component analyzer may be responsible for detecting/determining component dependencies. This process of dependency determination may be static (e.g., done by consulting a list of known dependencies) or dynamic (e.g., by querying/analyzing the components themselves).

Figure 5C:
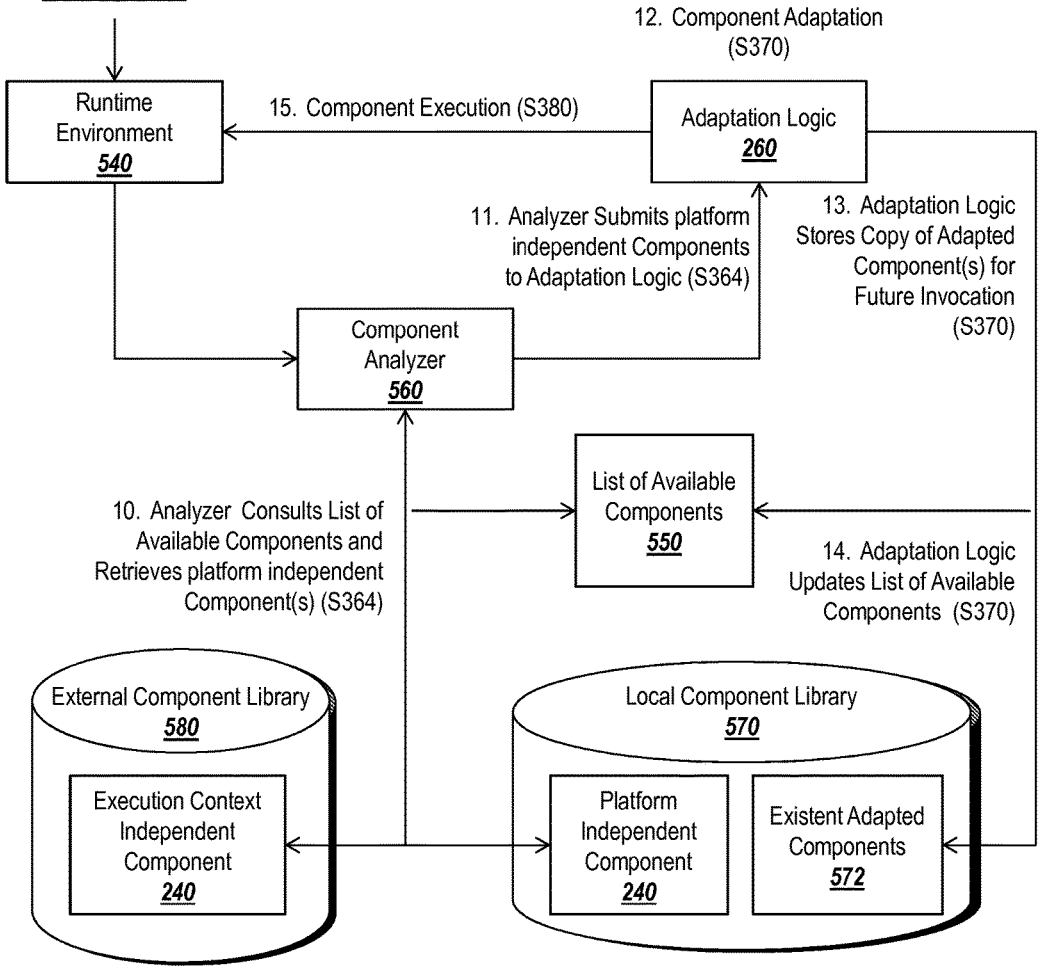

For example, as shown in FIG. 5C, the component analyzer 560 may consult a local component library 570 that is stored on the host system 500. The local component library 570 may include execution context independent components 240, and any existent (previously adapted) components 572.

If some of the components on the list of required components cannot be found in the local component library 570, the component analyzer 560 may consult an external component library 580 which may be stored remotely with respect to host system 500. For example, the external component library 580 may be hosted by a vendor of the runtime environment 540, by a third party, etc.

Once the required components are retrieved (either in an execution context independent format or an execution context specific format), the component analyzer 560 may submit the required components to the adaptation logic 260, which may generate an adapted component by wrapping the required components in a wrapper. The adaptation logic may generate native (e.g., execution-context-specific) source code for the adapted component, and may further compile the native source code so that the compiled native source code may be directly invoked in the future. In some embodiments, the adaptation logic 260 may invoke the interface request broker (as noted above) at this stage.

The adaptation logic 260 may then store the adapted component in the local component library 570 among the existent adapted components 572. Adaptation logic 260 may further update the list of available components 550 to reflect that the requested component represented by the interface 450 has now been adapted and may be statically called in the future.

The adaptation logic may then submit the adapted component to the runtime environment 540, which may execute the adapted component. Data marshaling for the adapted component may be performed by the wrapper. Once a properly formatted output is generated by the adapted component, the response may be forwarded to the client program 400.

Figure 5D:
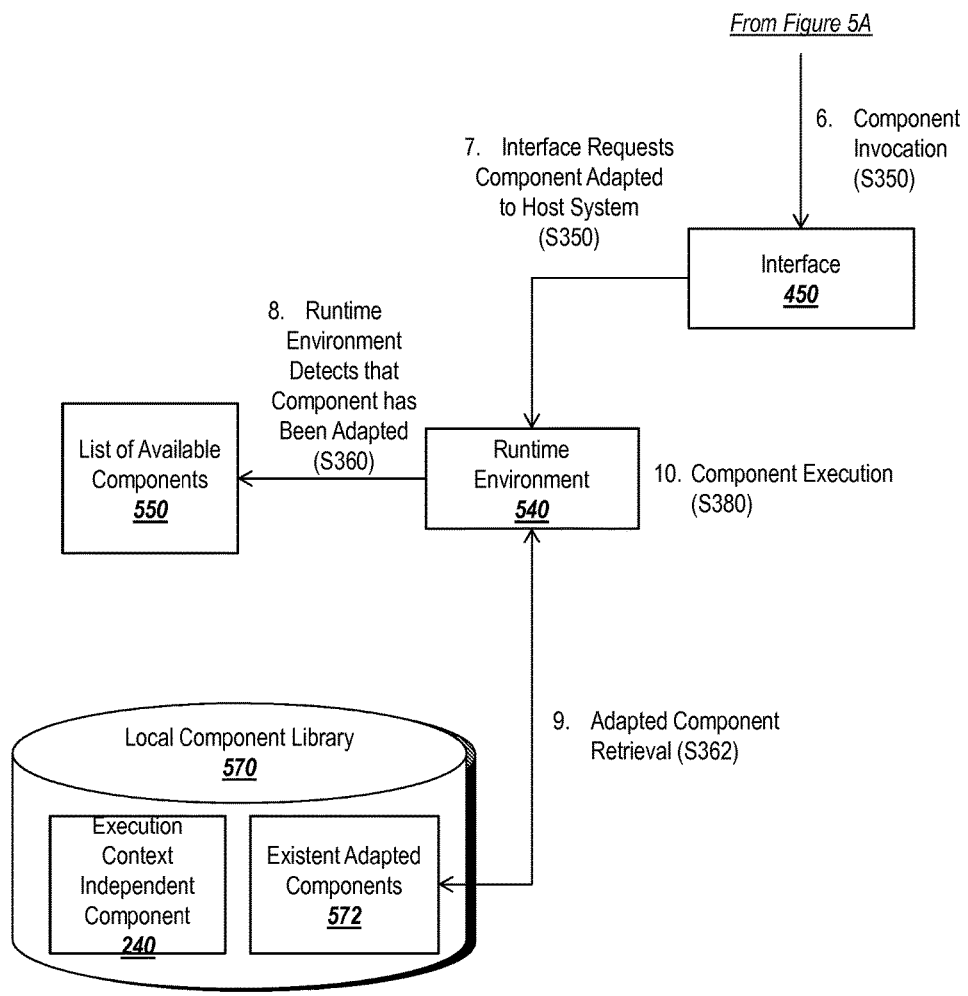

If an adapted component is invoked in the future, the runtime environment 540 may statically call the adapted component, as shown in FIG. 5D. Upon receiving a request for an adapted component from the interface 450, the runtime environment 540 may consult the list of available components 550 to determine that the component has already been adapted. Upon determining that the component has already been adapted, the runtime environment 540 may retrieve the adapted component from the local component library 570, and may execute the adapted component.

Alternatively or in addition, the local component library 570 may include (in part) the list of component wrappers (e.g., a list of DLLs) loaded into the runtime environment. It is noted that execution context independent components might not be loaded by the runtime environment like DLLs. They might be loaded in a different fashion, or be stored on disk, waiting to be loaded.

Figure 6:
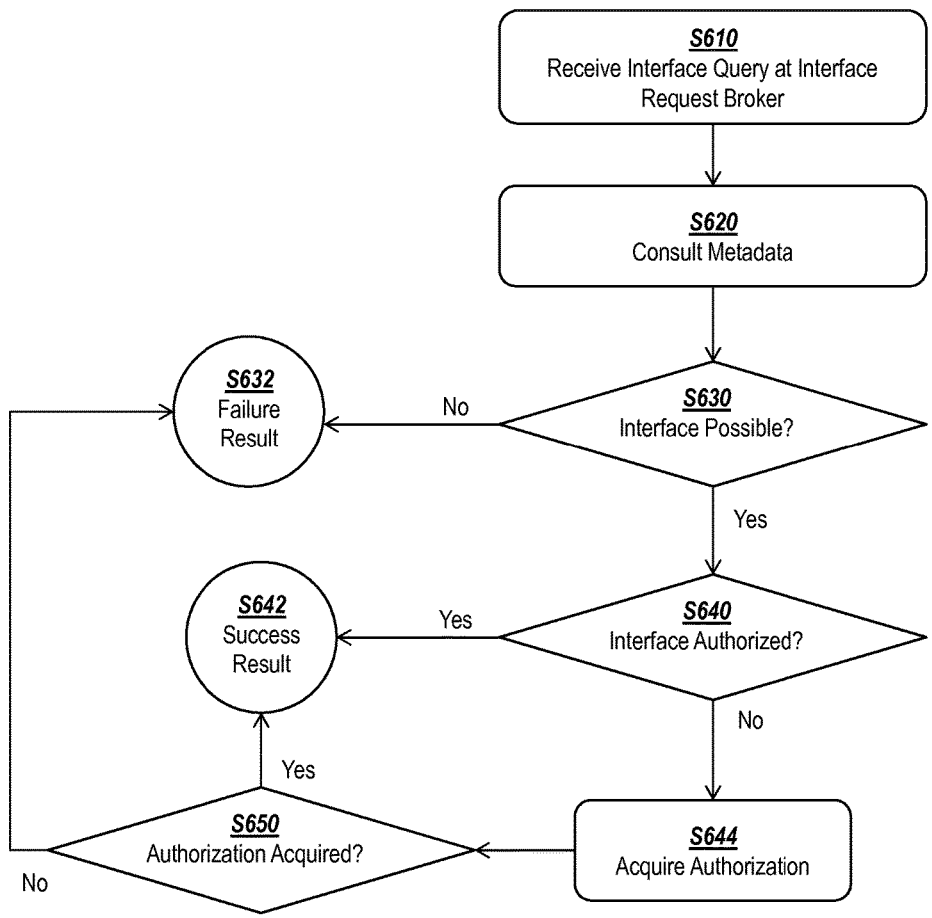
FIG. 6 is a flowchart describing an exemplary query to determine whether an interface is available.

Prior to executing the adapted component, the runtime environment 540 may determine whether the adapted component is authorized for execution in the current execution context. For example, the runtime environment # may consult the component licensing metadata 230 stored in the adapted component 200 and/or the interface 450. In order to avoid calling a component in an unauthorized context, a query may be used to determine whether the requested component is possible and/or available in the current execution context. For example, a user or program code may issue a query to gather information about a requested component. FIG. 6 is a flowchart describing an exemplary query that can be used to determine whether an interface to a requested component is possible/available.

At step S610, the interface request broker may receive an interface query. The interface query may include much of the same information as the interface request 410, including identifying the execution context, the identity of the requested component, and a type/order of any inputs to the components. The interface query may further include the identity of a user requesting access to the interface.

At step S620, the interface request broker (and/or interface generator) may consult the metadata in a metadata library and may retrieve any metadata entries associated with the requested component. The metadata entries may be analyzed to determine, at step S630, whether the interface is possible.

For example, if no metadata entries are associated with the requested component (or there are no entries for the requested component corresponding to the requested execution context and/or input types or orders), then it may be determined that it is not possible to provide the requested interface. Accordingly, processing may proceed to step S632, and the interface request broker may report a failure result.

If, on the other hand, it is determined at step S630 that the interface generator will be capable of generating the requested interface, processing may proceed to step S640 where the interface generator may determine whether the requested interface is authorized in the execution context specified in the interface query. For example, if the metadata entries indicate that the current user is authorized (e.g., licensed) to access the requested interface, then processing may proceed to step S642 and the interface request broker may report a success result.

However, if the interface generator determines that the interface is possible but is not authorized, the interface generator may attempt to acquire authorization for the interface at step S644. For example, the interface generator may instruct the interface request broker to present an option for acquiring authorization for the interface. For example, a graphical user interface ("GUI") window may be displayed. The GUI window may include information indicating that the current user is not authorized to access the requested interface, but that access is available (e.g., by licensing the requested interface). The GUI window may provide an option for providing payment to a vendor of the runtime environment to acquire the requested component. If the user opts not to authorize the interface at step 650, then processing may proceed to step S632 and the interface request broker may report a failure result. If the user opts to provide authorization at step S650, then processing may proceed to step S642 and the interface request broker may report a success result.

Alternatively or in addition, the interface generator may attempt to determine if an attempt to acquire authorization might succeed, but not actually attempt to acquire the authorization yet. For example, the interface generator might query a network license server to determine if the current user could check out a license, but not actually check out the license. License checkout might be deferred until a component is actually invoked.

Figure 7:
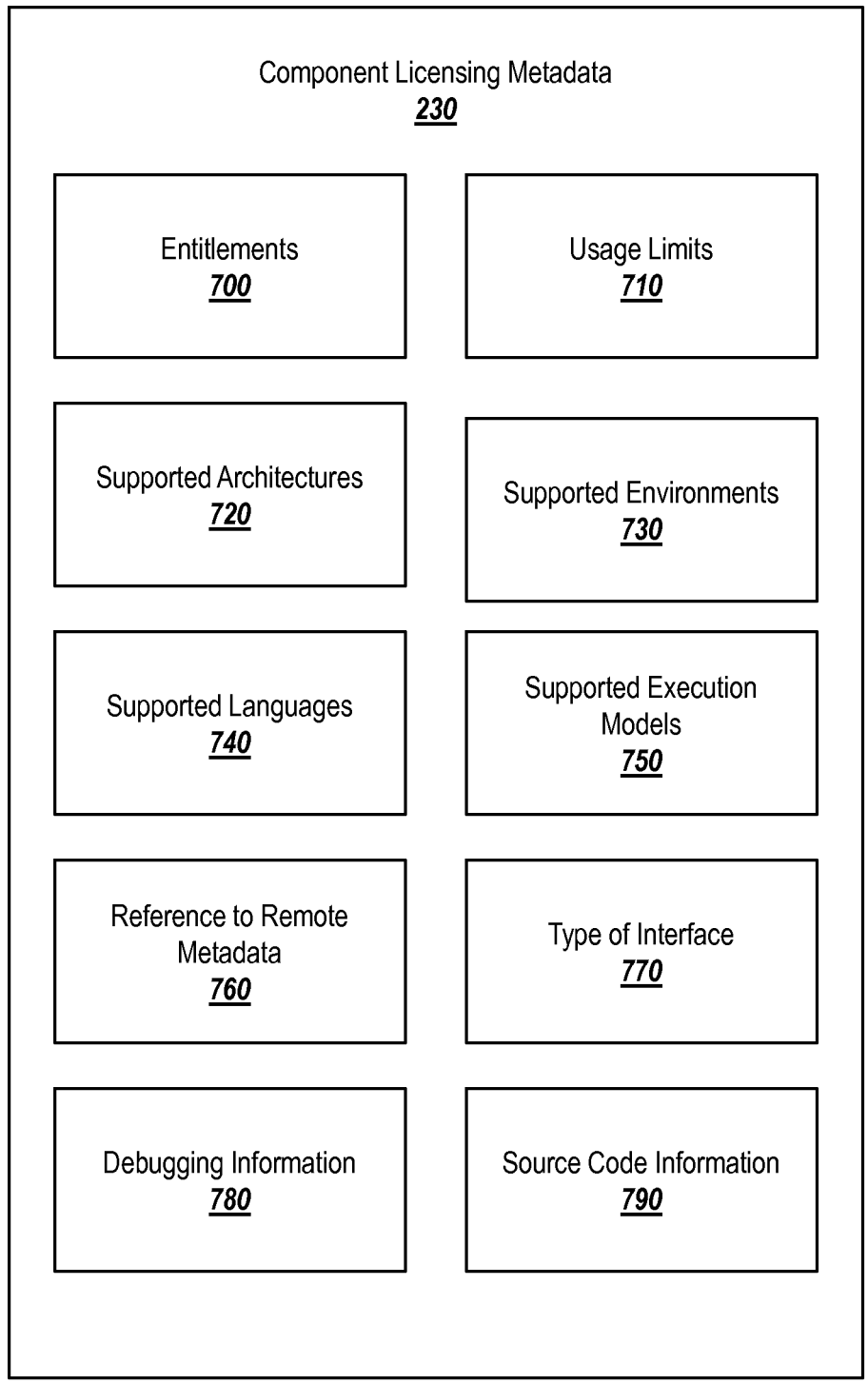
FIG. 7 depicts an exemplary data structure for holding component licensing metadata.

In addition, upon securing authorization for the requested component, the interface request broker may update the component licensing metadata entry 230 of the metadata library corresponding to the requested component. An exemplary component licensing metadata 230 entry is provided in FIG. 7.

The component licensing metadata 230 may include information describing who or what is authorized to use a particular component, and under what circumstances. For example, the component licensing metadata 230 corresponding to a particular component may specify a set of entitlements 700 representing the identities of users that are entitled to use the requested component. The list of entitlements may include, for example, a list of authorized users, a list of unauthorized users, etc.

The component licensing metadata 230 may further include usage limits 710. The usage limits 710 may specify how often (e.g., calls per client program, calls per unit of time, etc) the component corresponding to the component licensing metadata 230 may be invoked.

The component licensing metadata 230 may further include information related to supported architectures 720, supported environments 730, supported languages 740, and supported execution models 750. This information generally corresponds to the execution context 420 elements (422, 424, 426, and 428) previously discussed.

A reference to remote metadata 760 may further be included in the component licensing metadata 230. The reference 760 may include a pointer to locally-stored metadata, or an address or path to metadata stored remotely.

The component licensing metadata 230 may include information about the type(s) of interfaces 770 that may be generated for the component. For example, if the component is an overloaded function, then there may be multiple different interfaces (corresponding, e.g., to possible combinations of inputs) that may be generated for the component. For example, a user may be entitled to use some of the types of interfaces, but not others.

The component licensing metadata 230 may further include information relating to code generated for or associated with a component, including debugging information 780 and source code information 790. A component may, for example, include all of its source code, in the original human written, human readable form. This would allow authorized users to debug through and possibly even modify the component. The debugging information may separately apply to the generated source code (generated by the interface generator to form the wrapper) and the component's constituent source code, the code that implements its features. That is, authorization to debug may be separately provided for each type of source code (one type may be authorized, one type not authorized, etc.).

The debugging information 780 may include information relating to debugging the component. For example, a user may not be authorized to view implementation details of the component, and hence the user's ability to debug the component may be restricted. In one embodiment, this may entail metadata instructing a debugger associated with the runtime environment executing the component to skip any breakpoints that would allow the user to extract implementation details related to the component. In another embodiment, this may entail obfuscating or encrypting the source code to prevent a debugger from being able to set breakpoints in it in the first place.

The source code information 790 may include information relating to viewing or modifying the component in source code. For example, a user may be authorized to invoke the component, but may not be authorized to modify the component (or any source code generated from the component). Similarly, a user may be authorized to invoke the component, but may not be authorized to view the implementation details related to the component. In this circumstance, obscured source code that prevents the user from seeing the implementation details of the component may be generated.

Component licensing metadata 230 used in conjunction with adapted components allow components, suitable for use with disparate execution contexts, to be efficiently deployed. The runtime engine 540 in combination with the complete contents of external component library 580 may be quite large. The adapted component 200 may not require the all the parts of runtime engine 540 and external component library 580. The adaption process depicted in FIG. 5C may acquire a smaller (even minimal) set of the aforementioned parts. Therefore, given the appropriate license authorization, a component may adapt itself to multiple execution contexts and may acquire a smaller set of supporting file than would result from a full installation of runtime engine 540 and external component library 580 for each execution context. Among other possibilities, a vendor may distribute an adaptable runtime environment and license the adaptable runtime environment to developers on an as-needed basis.

Figure 8:
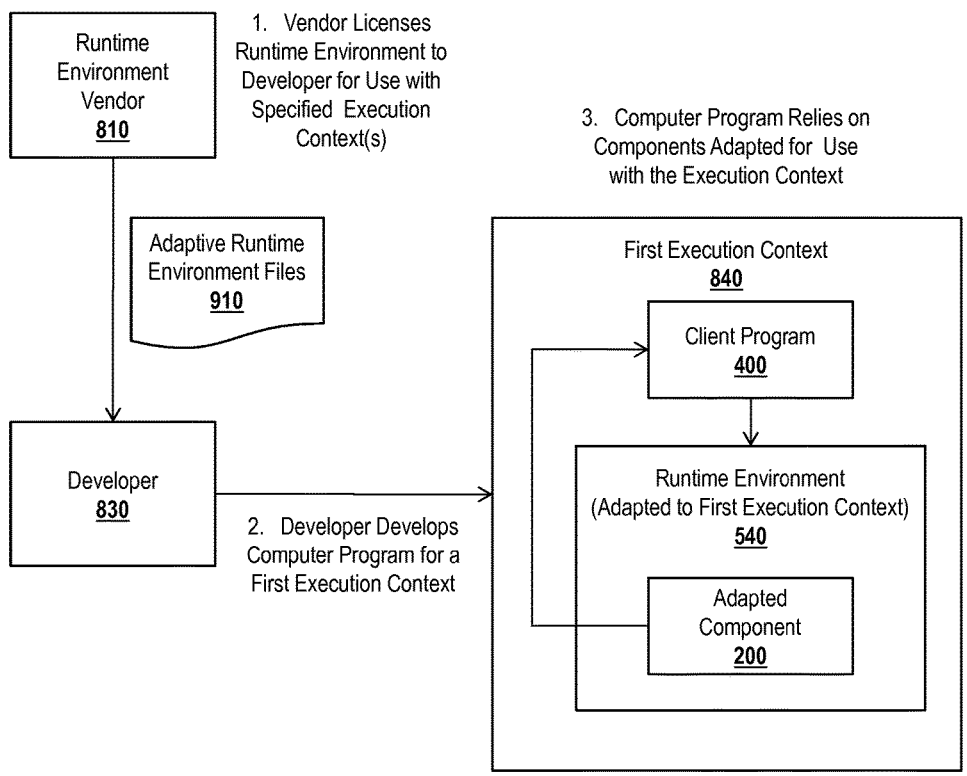
FIG. 8 depicts a computer program development process according to an exemplary embodiment
Figure 9:
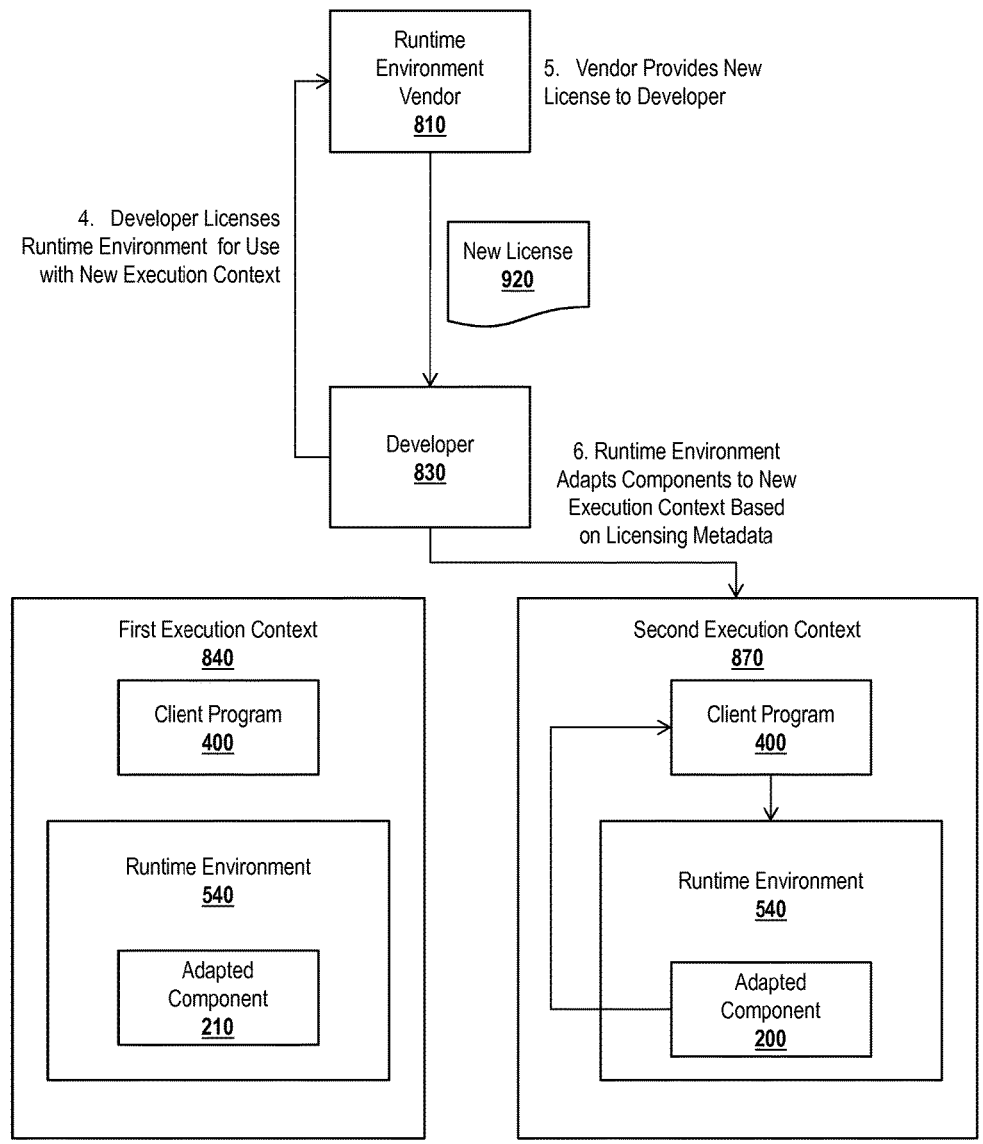
FIG. 9 depicts a computer program development process according to an exemplary embodiment.

An example of deploying an adaptable runtime environment supporting adapted components according to an exemplary embodiment is shown in FIGS. 8-9. In this example, the developer 830 may license an adaptive runtime environment from the runtime environment vendor 810. The runtime environment vendor 810 may accordingly provide the developer with adaptive runtime environment files 910 for installing the adaptive runtime environment 540 in a licensed first execution context 840. The runtime environment 540 may provide adapted components 200 for use with a client program 400. In this case, the adapted components 200 may be adapted to the first execution context 840 as described in exemplary embodiments above.

When the developer 830 wishes to license the runtime environment 540 for use with a second execution context 870, the developer 830 may acquire a new license 920 from the runtime environment vendor 810. The new license 920 may include information regarding which execution contexts the developer 830 has licensed for the runtime environment 540. Because the license 920 only needs to include limited information regarding authorized execution contexts, the license 920 may be much smaller in size than a new runtime environment (such as the second runtime environment files 860 of the example depicted in FIG. 8B). Accordingly, the runtime environment vendor 810 may provide a much smaller file to the developer 830, which simplifies the process of providing a runtime environment compatible with a new execution context.

When the client program 400 attempts to access an adapted component 200 in the second execution context 870, the runtime environment 540 may determine that the new license 920 has been acquired, thereby authorizing the developer 830 to use components in the second execution context 870. Accordingly, the runtime environment may locally generate a new adapted component 200 that is adapted to the second execution context 870 using the techniques described here.

Figure 10A:
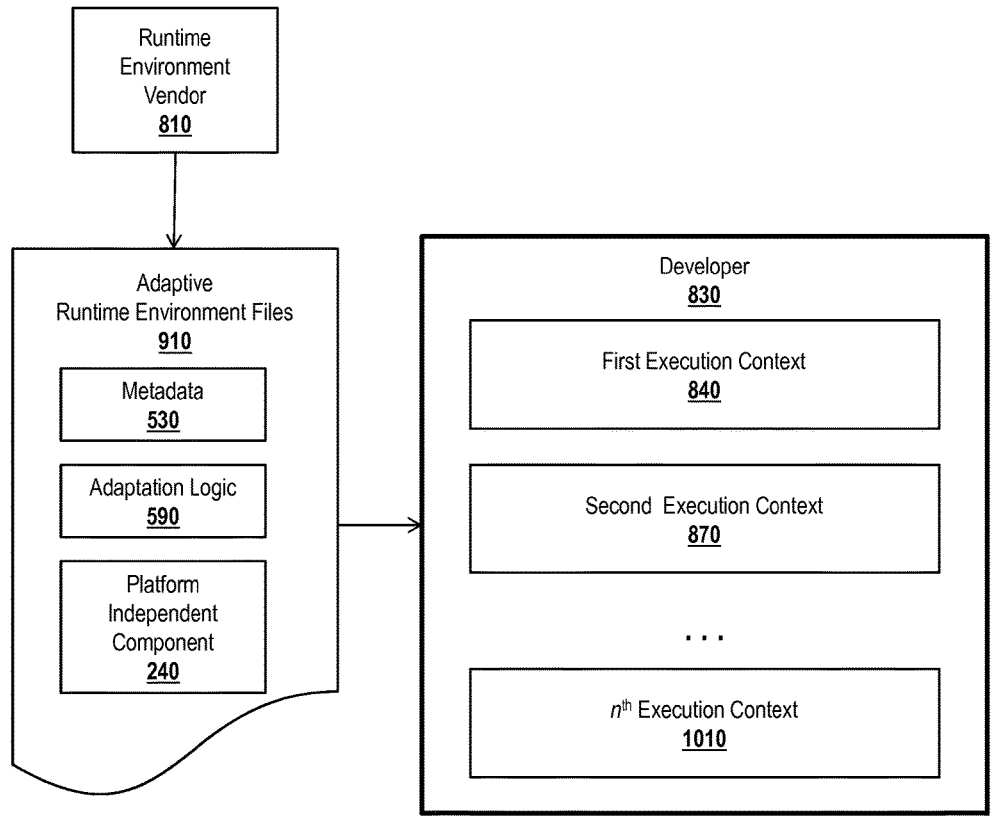
FIG. 10A depicts an exemplary process for providing a runtime environment according to an exemplary embodiment.

Deploying an adapted runtime environment (which may adapt itself to different execution contexts) may be more efficient and simpler than relying on runtime environments that use components native to the execution context for which they are intended. As shown in FIG. 10A, a runtime environment vendor 810 may only have to provide initial adaptive runtime environment files 910 to the developer 830. The developer 830 may then use the runtime environment # in a first execution context 840, a second execution context 870, and so on through an $n^{th}$ execution context 1010, assuming that the developer 830 has acquired n licenses from the runtime environment vendor 810.

The adaptive runtime environment files 910 provided by the runtime environment vendor 810 may include files relating to the runtime environment 540, a subset of the external component library 580, metadata 530 indicating which execution contexts the developer 830 has licensed, execution context independent components 240 that can be adapted to each of these execution contexts, and adaption logic 590 for performing the adapting. Thus, a complete set of files for runtime environment 540 does not need to be deployed for each execution context the developer 830 wishes to use. Further, new versions of adaptive components may not need to be deployed because adaption logic 590 may be able to adapt them to the new runtime environment 540 and execution context 830.

Figure 10B:
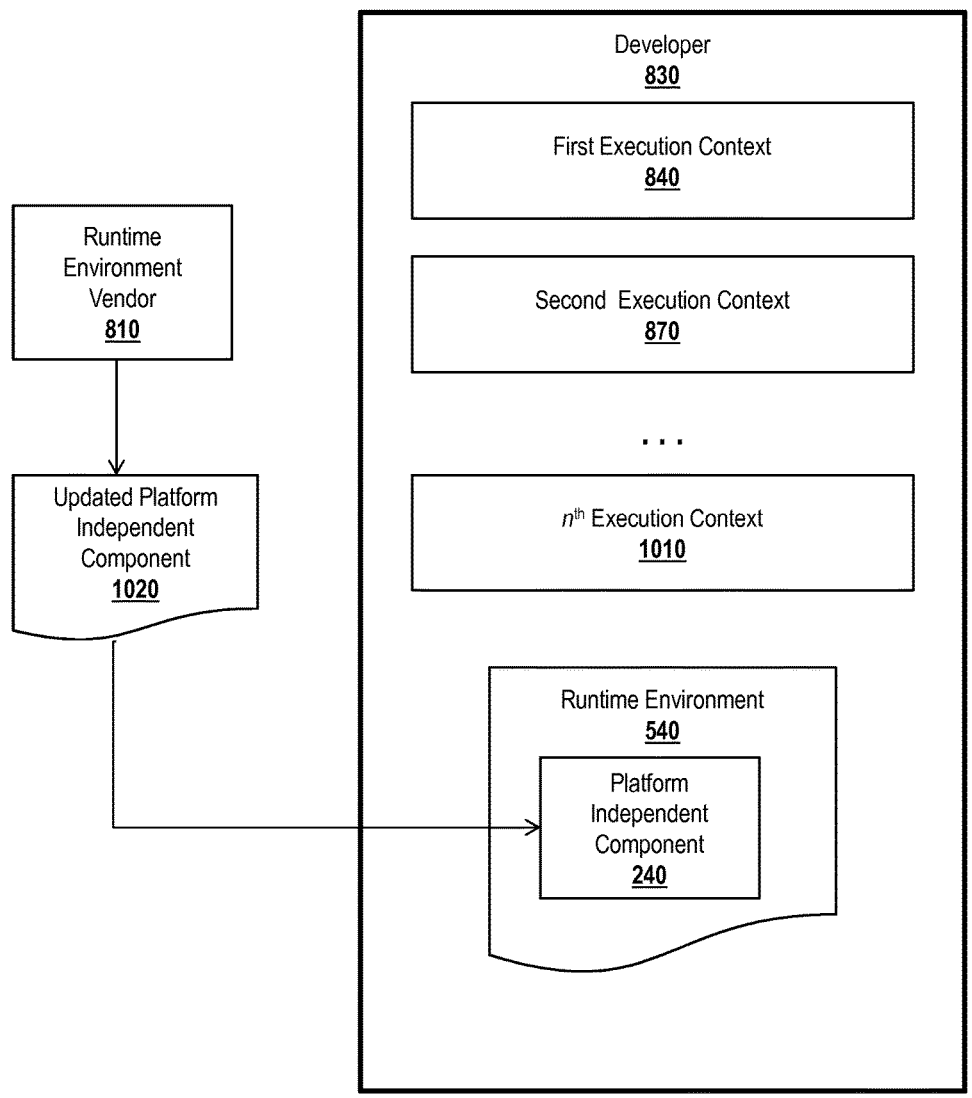
FIG. 10B depicts an exemplary process for updating the runtime environment provided in FIG. 10A.
Figure 10C:
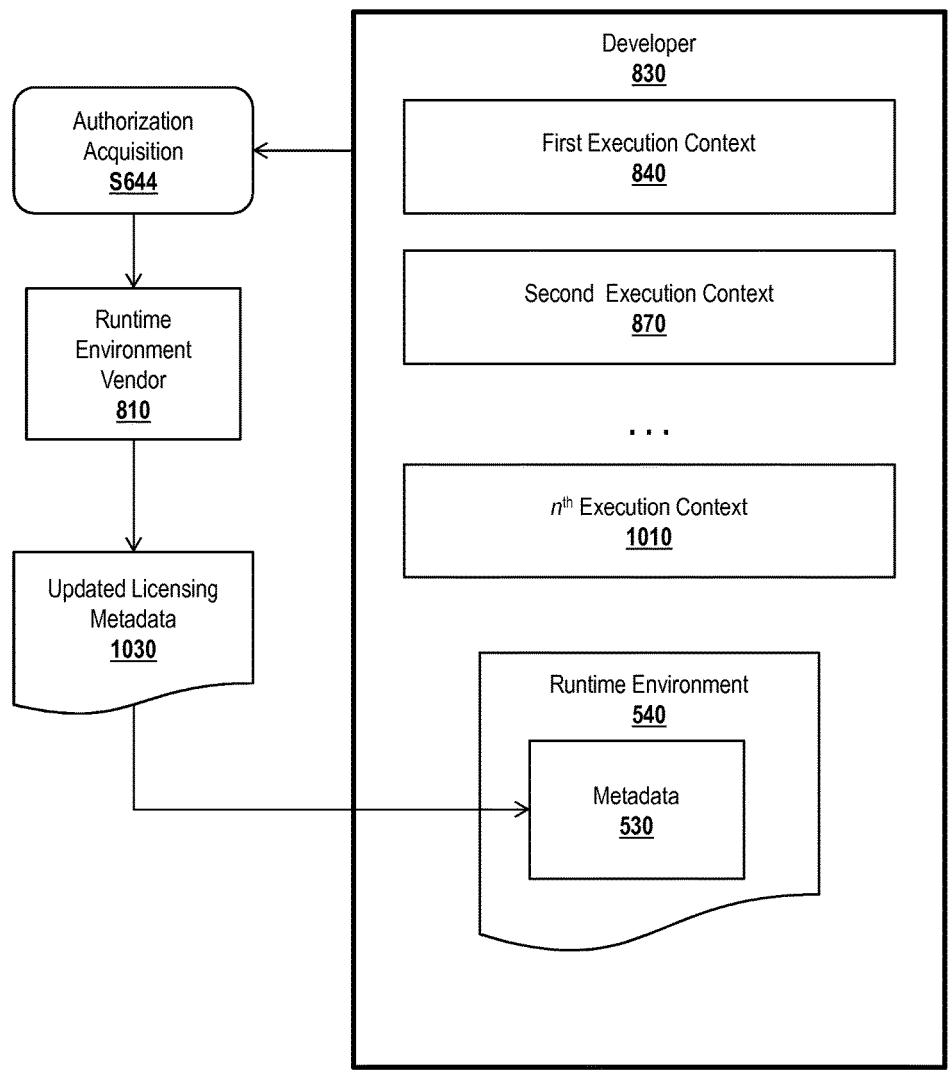
FIG. 10C depicts an exemplary process for licensing the runtime environment provided in FIG. 10A in a new execution context.

Adapted components may also allow for ease of updating the components. Conventionally, if a new component is made available after a runtime environment is deployed, or if an existing component is updated, the runtime environment vendor 810 may need to develop a specialized version of the component for each runtime environment licensed by the developers who have deployed the runtime environment. The runtime environment vendor 810 may then push a variety of different patches (e.g., one for each type of runtime environment) to the developers in order to update the deployed runtime environments According to exemplary embodiments using adapted components, if a new component becomes available or an old component is updated by the runtime vendor 810, the runtime vendor 810 no longer needs to push a specialized version of the component for each execution context in which the component is employed. Rather, as shown in FIG. 10B, the runtime environment vendor 810 merely provides a new or updated execution context independent component 1020. The new or updated execution context independent component 1020 may be integrated with the existing runtime environment 540, and the existing adaptation logic may adapt the new or updated execution context independent component 1020 to the different execution contexts licensed by the developer 830.

If a developer 830 wishes to license components for use in a new execution context, the developer 830 may (as shown in FIG. 10B) request a license from the runtime environment vendor 810. The runtime environment vendor 810 may provide updated licensing metadata 1030, which may update or replace the metadata 530 associated with the runtime environment 540. Thus, the runtime environment 540 may be allowed to adapt the components of the runtime environment to new execution contexts, without the need to deploy a new runtime environment or new, specialized components.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG.

11 depicts an example of an electronic device 1100 that may be suitable for use with one or more acts disclosed herein.

The electronic device 1100 may take many forms, including but not limited to a computer, workstation, server, network computer, optical computer, Internet appliance, mobile device, a pager, a tablet computer, a smart sensor, application specific processing device, etc.

Figure 11:
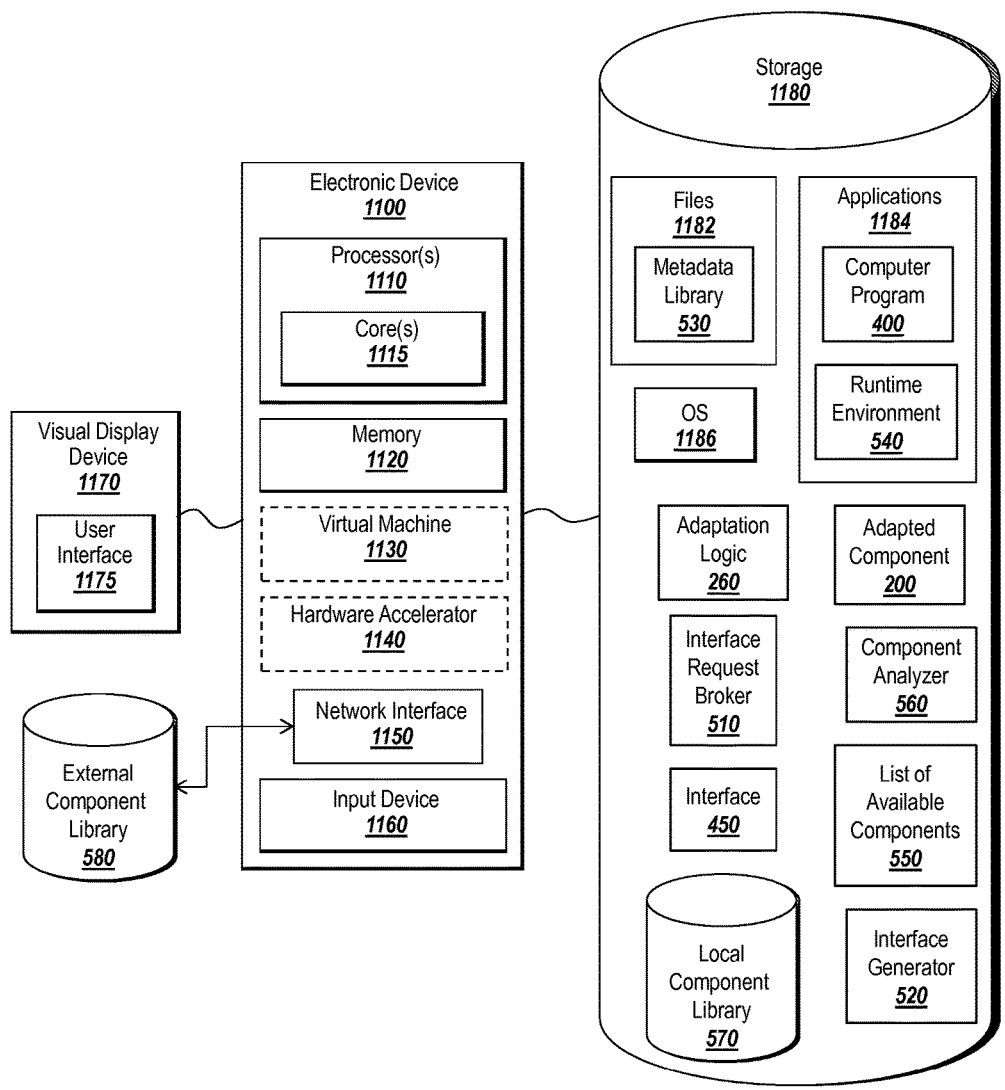
FIG. 11 depicts an electronic device suitable for use with exemplary embodiments.

The electronic device 1100 is illustrative and may take other forms. For example, an alternative implementation of the electronic device 1100 may have fewer components, more components, or components that are in a configuration that differs from the configuration of FIG. 11. The components of FIG. 11 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 1110 may include hardware based logic or a combination of hardware based logic and software to execute instructions on behalf of the electronic device 100. The processor 1110 may include logic that may interpret, execute, and/or otherwise process information contained in, for example, the memory 1120. The information may include computer-executable instructions and/or data that may implement one or more embodiments of the invention. The processor 1110 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 1115. Moreover, the processor 1110 may include a system-on-chip (SoC) or system-in-package (SiP). An example of a processor 1110 is the Intel® Xeon® processor available from Intel Corporation, Santa Clara, Calif.

The electronic device 1100 may include one or more tangible non-transitory computer-readable storage media for storing one or more computer-executable instructions or software that may implement one or more embodiments of the invention. The non-transitory computer-readable storage media may be, for example, the memory 1120 or the storage 1180. The memory 1120 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

The electronic device 1100 may include a virtual machine (VM) 1130 for executing instructions loaded in the memory 1120. A virtual machine 1130 may be provided to handle a process running on multiple processors so that the process may appear to be using only one computing resource rather than multiple computing resources. Virtualization may be employed in the electronic device 1100 so that infrastructure and resources in the electronic device may be shared dynamically. Multiple VMs 1130 may be resident on a single computing device 1100.

A hardware accelerator 1140, may be implemented in an ASIC, FPGA, or some other device. The hardware accelerator 1140 may be used to reduce the general processing time of the electronic device 1100.

The electronic device 1100 may include a network interface 1150 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 1150 may include a built-in network adapter, network interface card, personal computer memory card international association (PCMCIA) network card, card bus network adapter, wireless network adapter, universal serial bus (USB) network adapter, modem or any other device suitable for interfacing the electronic device 1100 to any type of network capable of communication and performing the operations described herein. The network interface may connect the electronic device 1100 to one or more external component libraries 580.

The electronic device 1100 may include one or more input devices 1160, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 1160 may allow a user to provide input that is registered on a visual display device 1170. A graphical user interface (GUI) 1175 may be shown on the display device 1170.

A storage device 1180 may also be associated with the electronic device 1100. The storage device 1180 may be accessible to the processor 1110 via an I/O bus. The information in the storage device 1180 may be executed, interpreted, manipulated, and/or otherwise processed by the processor 1110. The storage device 1180 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 1180 may be used for storing one or more files 1182, such as the above-described metadata library 530. The storage device 1180 may further store applications 1184, such as the above-described client program 400 and the runtime environment 540.

The electronic device 1110 can further be running an operating system (OS) 1186. Examples of OS 1186 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

Additionally, the storage device 1180 may store logic corresponding to the adaptation logic 260, the interface request broker 510, and the interface generator 520. The storage device 1180 may further store logic and/or data structures corresponding to the interface 450, the local component library 570, the adapted component 200, and the list of available components 550.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 12:
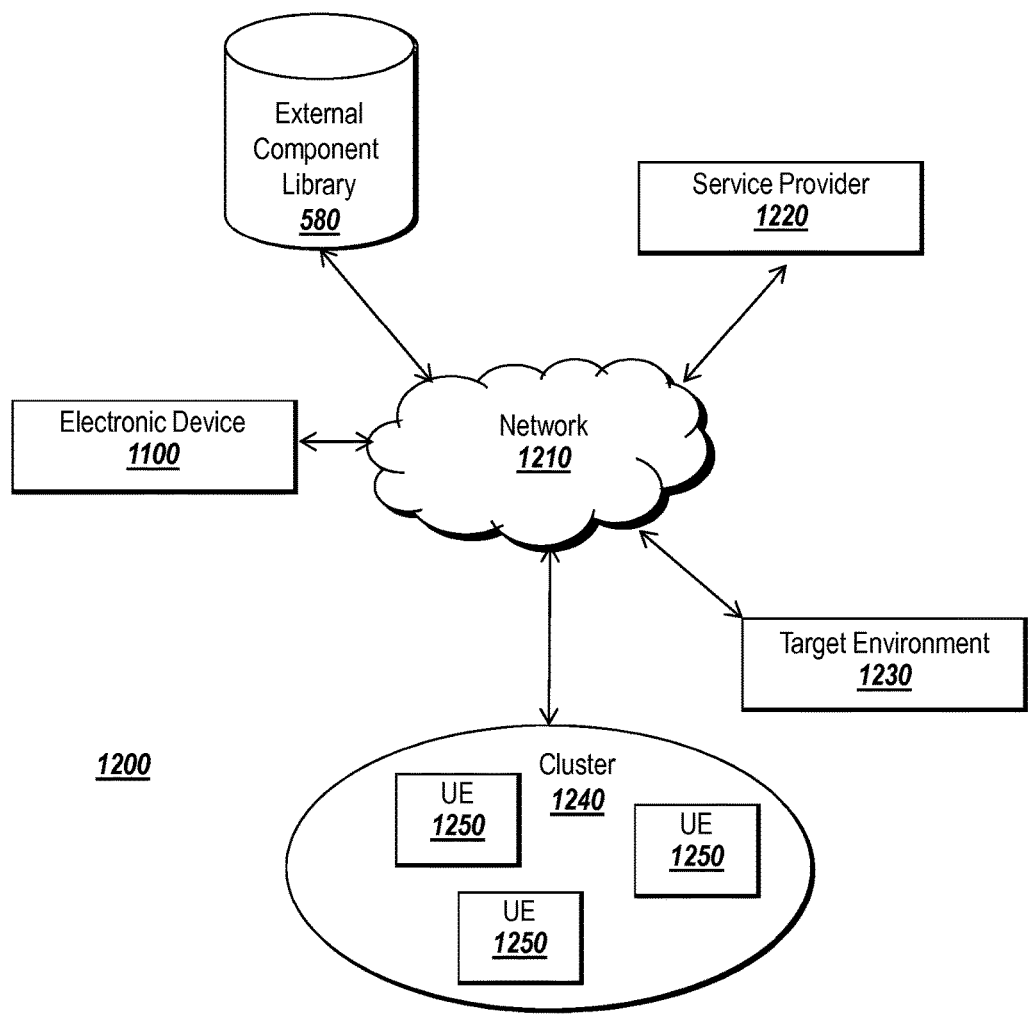
FIG. 12 depicts an exemplary network configuration suitable for use with exemplary embodiments.

In some embodiments, the electronic device 1100 may be part of a network implementation. FIG. 12 depicts an exemplary network implementation that may implement one or more embodiments of the invention. A system 1200 may include an electronic device 1100, an external component library 580, a network 1210, a service provider 1120, a target environment 1230, and a cluster 1240. The embodiment of FIG. 12 is exemplary, and other embodiments can include more devices, fewer devices, or devices in arrangements that differ from the arrangement of FIG. 12.

The network 1210 may transport data from a source to a destination. Embodiments of the network 1210 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the electronic device 1100, the service provider 1220, etc.). Data may include digital information or analog information. Data may further be packetized and/or non-packetized.

The network 1210 may be a hardwired network using wired conductors and/or optical fibers and/or may be a wireless network using free-space optical, radio frequency (RF), and/or acoustic transmission paths. In one implementation, the network 1210 may be a substantially open public network, such as the Internet. In another implementation, the network 1210 may be a more restricted network, such as a corporate virtual network. The network 1210 may be the Internet, an intranet, Local Area Network (LAN), Wide Area Network (WAN), Metropolitan Area Network (MAN), wireless network (e.g., using IEEE 802.11), or other types of network. The network 1210 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 1220 may include a device that makes a service available to another device. For example, the service provider 1220 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 1230 may include a device that receives information over the network 1210. For example, the target environment 1230 may be a device that receives user input from the electronic device 1100.

The cluster 1240 may include a number of units of execution (UEs) 1250 and may perform processing on behalf of the electronic device 1100 and/or another device, such as the service provider 1220. For example, the cluster 1240 may perform parallel processing on an operation received from the electronic device 1100. The cluster 1240 may include UEs 1250 that reside on a single device or chip or that reside on a number of devices or chips.

The units of execution (UEs) 1250 may include processing devices that perform operations on behalf of a device, such as a requesting device. A UE may be a microprocessor, field programmable gate array (FPGA), and/or another type of processing device. UE 1250 may include code, such as code for an operating environment. For example, a UE may run a portion of an operating environment that pertains to parallel processing activities. The service provider 1220 may operate the cluster 1240 and may provide interactive optimization capabilities to the electronic device 1100 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of a electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory computer-readable medium storing instructions that, when executed by one or more processors, cause the one or more processors to:
   receive a component request from a client, the component request specifying:
      a requested component, the requested component being executable, and
      an execution context, the execution context comprising:
         an attribute that relates to circumstances under which the requested component is executed;
   process the received component request to access or generate an interface for the specified execution context for invoking the requested component in the specified execution context and to forward the interface to the client;
   generate an adapted component based on the received component request, the adapted component:
      having a wrapper that translates input to the component into a format that is understandable by the component and/or translates output from the component into a format that is understandable to the client, and
      implementing the requested component;
   wherein the component request further specifies one or more local components; and
   wherein generating a response to the component request comprises:
      analyzing the one or more local components,
      identifying if there is a missing component, the missing component used by the requested component,
      where there is a missing component, retrieving the missing component from an external component library, and adding the missing component to the adapted component; and
   execute the requested component.

2. The medium of claim 1, wherein the component is executed as a part of a simulation.

3. The medium of claim 1, wherein the component request further specifies a type or order for at least one input to the requested component.

4. The medium of claim 1, wherein the requested component is not compatible with the execution context prior to being adapted.

5. The medium of claim 1, further storing instructions that, when executed by one or more processors, cause the one or more processors to:
dynamically generate the adapted component when the component request is received.

6. The medium of claim 1, wherein the attribute of the execution context comprises at least one of:
a programming language,
a target architecture,
a host platform, and
an execution model.

7. The medium of claim 6, wherein the wrapper is a host-platform-specific wrapper that calls execution context independent code, the execution context independent code implementing the requested component.

8. The medium of claim 7, wherein the host-platform-specific wrapper is identified by a wrapper name, and the wrapper name corresponds to a name for the requested component.

9. The medium of claim 1, wherein the adapted component performs data marshaling for the requested component.

10. The medium of claim 1, further storing instructions that, when executed by one or more processors, cause the one or more processors to:
retrieve the adapted component from a library.

11. The medium of claim 1, further storing instructions that, when executed by one or more processors, cause the one or more processors to:
analyze the component request,
determine one or more dependent functions called by the requested component, the determining based at least in part on the analyzing,
acquire the one or more dependent functions, and
adapt the one or more dependent functions to the execution context of the adapted component so that the requested component may invoke the one or more dependent functions.

12. The medium of claim 1, further storing instructions that, when executed by one or more processors, cause the one or more processors to:
receive authentication, and
generate or execute the adapted component only if authorized to access the requested component in the execution context specified in the component request.

13. The medium of claim 1, wherein the adapted component contains licensing metadata specifying a permitted entity, the permitted entity being allowed to use the adapted component.

14. The medium of claim 13, wherein the licensing metadata further specifies at least one of: a usage limit, a supported architecture, a type of interface generated for the adapted component, information for debugging the adapted component, a valid execution model for the adapted component, information relating to viewing or modifying source code for the adapted component, and a supported environment for the adapted component.

15. A computer-implemented method comprising:
receiving, using one or more processors, a component request from a client, the component request specifying:
a requested component, the requested component being executable, and
an execution context, the execution context comprising an attribute that relates to the circumstances under which the requested component is executed;
processing, using the one or more processors, the component request to access or generate an interface for an execution context for invoking the requested component in the execution context and to forward the interface to the client;
generating, using one or more processors, a response to the component request, the response comprising an adapted component, the adapted component:
having a wrapper that translates input to the component into a format that is understandable by the component and/or translates output from the component into a format that is understandable to the client, and
implementing the requested unit of functionality;
wherein the component request further specifies one or more local components;
wherein generating the response to the component request comprises:
analyzing the one or more local components,
identifying if there is a missing component, the missing component used by the requested component,
where there is a missing component, retrieving the missing component from an external component library, and adding the missing component to the adapted component; and
executing the request component.

16. The method of claim 15, further comprising:
dynamically generating the adapted component when the component request is received.

17. The method of claim 15, wherein the component request further specifies a host platform of the client, the host platform describing one or more system parameters of the client, and the adapted component is further compatible with the host platform.

18. The method of claim 17, wherein the wrapper is a host-platform-specific wrapper that calls platform independent code implementing the requested component.

19. The method of claim 18, wherein the host-platform-specific wrapper is identified by a wrapper name, and the wrapper name corresponds to a name of the requested unit of functionality.

20. A system comprising:
a non-transitory storage medium storing:
a library of components; and
one or more processors configured to:
process a component request from a client to access or generate an interface for an execution context for invoking the requested component in the execution context and to forward the interface to the client, the component request specifying:
the execution context comprising an attribute that relates to the circumstances under which the requested component is executed, and
a requested unit of functionality;
identify a target component in the library, the target component compatible with the component request;
generate a response to the component request, the response comprising an adapted component, the adapted component:
having a wrapper that translates input to the component into a format that is understandable by the component and/or translates output from the component into a format that is understandable to the client
having been generated from the target component,
implementing the requested unit of functionality;
wherein the component request further specifies one or more local components; and wherein generating the response to the component request comprises:
analyzing the one or more local components,
identifying if there is a missing component, the missing component used by the requested component,
where there is a missing component, retrieving the missing component from an external component library, and adding the missing component to the adapted component; and
execute the requested component.

* * * * *